US008806096B1

(12) United States Patent
Patil et al.

(10) Patent No.: US 8,806,096 B1
(45) Date of Patent: Aug. 12, 2014

(54) INCREASED CONCURRENCY OF AN INITIALIZATION PROCESS OF MULTIPLE DATA STORAGE UNITS OF A VOLUME

(75) Inventors: Vishal Patil, Morrisville, NC (US); Albert E. Yong, Morrisville, NC (US)

(73) Assignee: NetApp, Inc., Sunnyvale, CA (US)

( * ) Notice: Subject to any disclaimer, the term of this patent is extended or adjusted under 35 U.S.C. 154(b) by 1454 days.

(21) Appl. No.: 11/788,520

(22) Filed: Apr. 20, 2007

(51) Int. Cl.
*G06F 13/12* (2006.01)
*G06F 3/06* (2006.01)

(52) U.S. Cl.
CPC .................................. *G06F 3/0689* (2013.01)
USPC ........................................................ 710/74

(58) Field of Classification Search
None
See application file for complete search history.

(56) References Cited

U.S. PATENT DOCUMENTS

| | | | | |
|---|---|---|---|---|
| 5,754,841 A | * | 5/1998 | Carino, Jr. ............................ 1/1 |
| 5,895,493 A | * | 4/1999 | Gatica ........................... 711/147 |
| 5,907,837 A | * | 5/1999 | Ferrel et al. ............................ 1/1 |
| 6,418,458 B1 | * | 7/2002 | Maresco ....................... 718/103 |
| 6,467,023 B1 | * | 10/2002 | DeKoning et al. ............. 711/114 |
| 7,647,590 B2 | * | 1/2010 | Archer et al. ................. 718/100 |
| 2004/0128360 A1 | * | 7/2004 | Petri et al. ..................... 709/214 |
| 2007/0136311 A1 | * | 6/2007 | Kasten et al. ................... 707/10 |
| 2008/0162817 A1 | * | 7/2008 | Batterywala .................. 711/118 |

* cited by examiner

*Primary Examiner* — Henry Tsai
*Assistant Examiner* — Aurangzeb Hassan
(74) *Attorney, Agent, or Firm* — DeLizio Gilliam, PLLC

(57) ABSTRACT

An apparatus and a method for initializing data storage units of a volume or multiple volumes in parallel for data access as part of an initialization process. The method may include assigning initialization tasks for each of the data storage units to the multiple worker threads, and each of the worker threads independently performing each of the initialization tasks. The apparatus may include a processor and a memory storing instructions which configure the processor to initialize an initialization process to initialize the data storage units of a volume or of multiple volumes in parallel for data access.

31 Claims, 19 Drawing Sheets

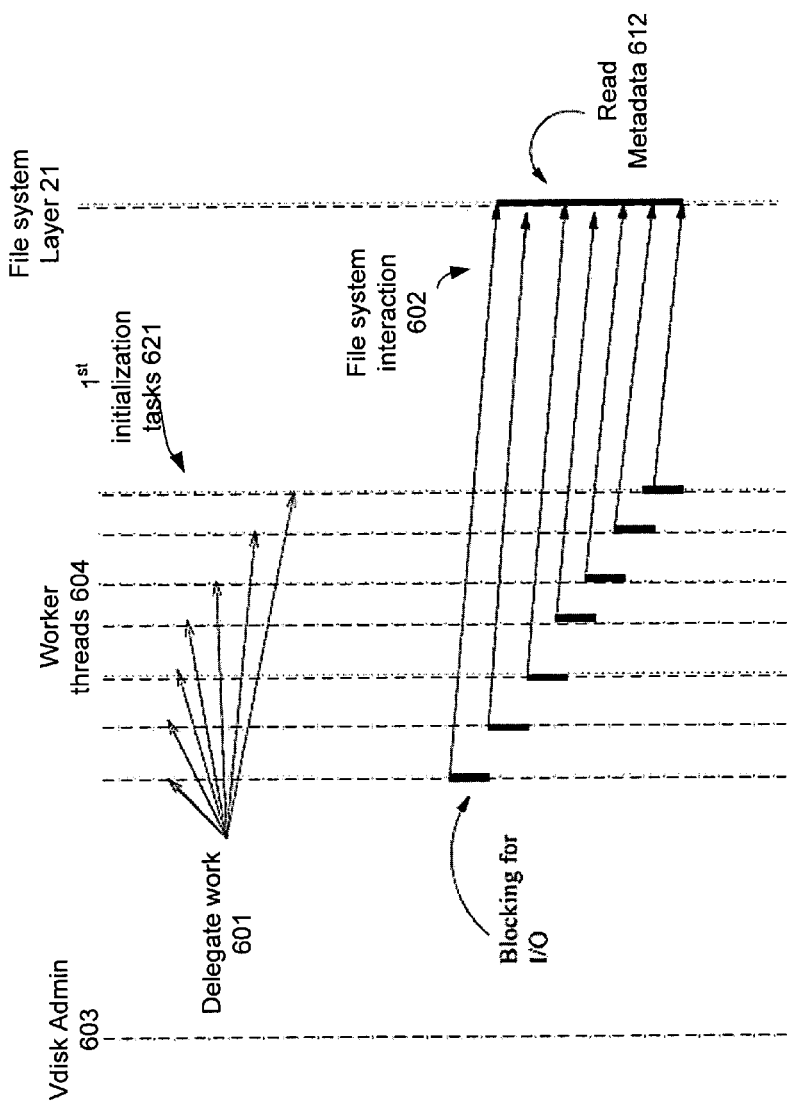

INCREASED CONCURRENCY OF AN INITIALIZATION PROCESS OF MULTIPLE DATA STORAGE UNITS OF A VOLUME

TECHNICAL FIELD

This invention relates to the field of network data storage systems and, in particular, to initializing multiple data storage units in a failover or reboot context in a network data storage system.

BACKGROUND

Various forms of network data storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc. Conventional network storage systems include file systems that include data sets, such as volumes, files (also referred to as containers, data storage units, logical units of data, logical unit numbers (LUNs), or virtual disks). A LUN may represent data on a physical disk or data of a virtual disk. The virtual disk or LUN may be physically represented as a regular file in the active file system, which in turn is treated specially by the operating system.

In conventional operating systems of network storage systems, LUNs are represented in a storage server as files contained in one or more volumes. To be externally visible to clients, LUNs must first go through an initialization process which prepares the LUNs for data access by the clients. This process may also be referred to as on-lining LUNs or a LUN on-lining procedure. This initialization process is performed whenever the storage server is in a state where the storage server is booting in a reboot or failover context. A LUN is traditionally associated with computer hardware, such as a disk drive. Within this disk drive is a disk controller that runs firmware. The disk controller is an embedded system that controls all aspects of the drive's functionality. This includes bringing the drive to an "online" state when it is powered up as well as handling I/O requests from clients. Representing LUNs as files decouples the LUN from the actual computer hardware, such as a disk drive. This allows the storage server to support an arbitrarily large number of LUNs even when the system may have far fewer disk drives. This ability to support a large number of LUNs exposes limitations with the conventional methods of on-lining LUNs.

For the entire duration that the storage server is in the rebooting or failover state, the storage server is unable to serve data. The time that the storage server is unable to serve data is called outage time. Since, initializing (e.g., on-lining) the LUNs is only one component of the entire boot or failover process, the amount of time the storage server takes to complete the initialization of the LUNs directly contributes to the outage time of the storage server. The outage time is the time that the storage server cannot serve data (e.g. off-line). Whenever the outage time exceeds input/output (I/O) timeout values established on the client-side, the excessive outage time can lead to application failure, which can negatively impact any service level agreements tied to system availability.

A conventional method by which the LUNs are initialized (e.g., on-lined) is that each volume is iterated over serially, and for each volume, each LUN is serially brought on-line asynchronously. In effect, each LUN is brought on-line serially due to the single administrative thread which processes each LUN one at a time. A conventional storage server initializes the LUNs by serially iterating through all of the LUNs of each volume, and performing subsequent operations for each LUN using a single administrative thread. The subsequent operations may include loading and reading information, such as mappings of the LUNs and their corresponding file handles, used by the file system layer by sending an asynchronous backdoor message to the file system layer. The backdoor message is a message type which provides an interface for subsystems in the operating system (e.g., Data ONTAP® software, available from Network Appliance of Sunnyvale, Calif.), to interact with the file system layer of the operating system.

This conventional method leaves a substantial amount of available system resources (e.g., processing, memory, and input-output (I/O) capabilities) unused. In addition, the asynchronous step is severely hampered by the serialization in the processing of each LUN. This is because the serial steps of the on-lining process are far more time consuming than the asynchronous steps. This may cause all the processing to queue up for a single administrative thread, which can only handle on-lining a single LUN at a time. The serialization is performed using a single administrative thread that is used to process each LUN of the volume.

In a data storage system with many volumes and LUNs, the initialization process cannot be scaled, and the serialization increases the overall latency to initialize (e.g., on-line) the LUNs. The increased latency to initialize the LUNs in turn contributes to increasing the outage time seen by clients attempting to perform I/O operations. The clients' I/O operations may timeout due to the excessive outage time on the storage server, which can ultimately lead to application failure.

SUMMARY OF INVENTION

Described herein are an apparatus and a method that initializes data storage units of a volume or multiple volumes in parallel for data access as part of an initialization process. The method may include assigning initialization tasks for each of the data storage units to multiple worker threads, and independently performing each of the initialization tasks using one of the worker threads. The apparatus may include a processor, and a memory storing instructions which configure the processor to initialize an initialization process which initializes the data storage units of a volume or of multiple volumes in parallel for data access. By using multiple worker threads to independently perform each of the initialization tasks, instead of a single administrative thread, the outage time that a storage server is unable to serve data is reduced. By reducing the initialization time of the storage server, and consequently the outage time, application failures can be reduced. In a failover context, by reducing the initialization time of the data storage units, the overall time that the clustered storage server serves data for the failed server is reduced. Similarly, in a reboot context, by reducing the initialization time of the data storage units, the total outage time of the storage server is reduced. Moreover, by using multiple worker threads to independently perform each of the initialization tasks in addition to the administrative thread, instead of a single administrative thread, the chance of a processing bottleneck at the administrative thread is reduced.

BRIEF DESCRIPTION OF THE DRAWINGS

The present invention is illustrated by way of example, and not by way of limitation, in the figures of the accompanying drawings.

FIG. 6B illustrates one embodiment of the administrative thread and the multiple worker threads that are configured to perform a particular initialization task in parallel.

DETAILED DESCRIPTION

Figure 1:
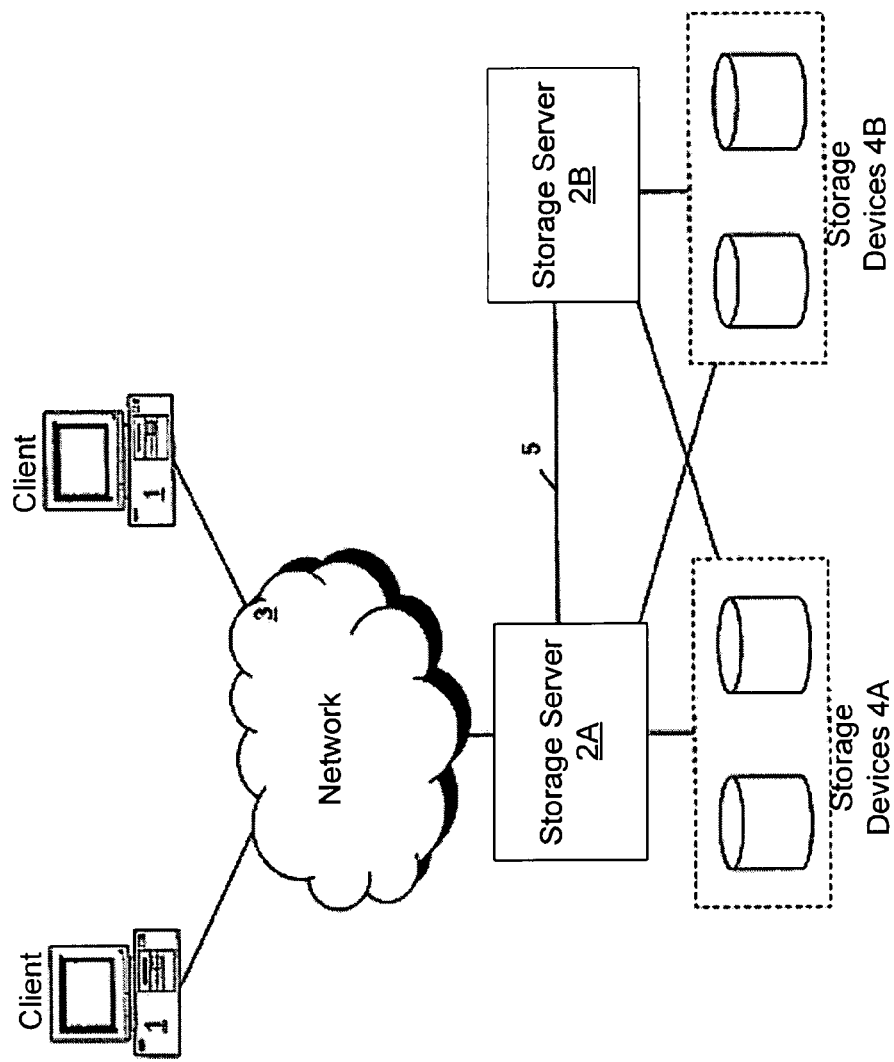
FIG. 1 illustrates a block diagram of one embodiment of an environment including a cluster failover (CFO) system configuration.

Described herein are apparatuses and methods for initializing data storage units of one or more volumes in parallel for data access as part of an initialization process. The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to facilitate understanding of the present invention. Thus, the specific details set forth are merely exemplary. Particular implementations may vary from these exemplary details and still be contemplated to be within the spirit and scope of the present invention.

Parallel Initialization

As described above, storage servers initialize their volumes and LUNs for data access by clients by serially iterating through all of the LUNs of each volume, and performing subsequent operations for each LUN using a single administrative thread. Also, as described above, since this serialization in initializing the LUNs uses only one single administrative thread to perform the initialization tasks, each initialization task is queued at this single administrative thread. Moreover, the single administrative thread only processes one initialization task at a time, and thus, creates a processing bottleneck with file systems with large number of LUNs.

The processing work to initialize each LUN is largely self-contained, such that the work can be parallelized. This can be achieved by using a set of worker threads, in addition to the administration thread (e.g., virtual disk administrative thread), such that each worker thread processes a particular volume in parallel with the processing of other volumes by other worker threads, and each worker thread processes initialization tasks of all LUNs of a particular volume in parallel. This organization of work eliminates the inherent bottleneck of the conventional storage servers that use a single administrative thread to serially initialize the volumes and LUNs.

The embodiments described herein of parallel initialization of the volumes and LUNs can greatly speed up the overall boot and failover process by making better use of the available resources, such as available processing, memory, and I/O capabilities of the storage server. Furthermore, the embodiments of using multiple worker threads to independently perform initialization tasks may reduce the initialization time of the data storage units, which reduces the total outage time of the storage server. For example, in the reboot context, reducing the initialization time of the data storage units may be beneficial since the storage server is able to start serving data sooner than a storage server that is initialized using the serial initialization. Similarly, by reducing the initialization time of the data storage units in a failover context, for example, the total outage time of a failed server is reduced, as well as the time that the cluster partner serves data for the failed server. Also as described above, when the outage time exceeds I/O timeout values established on the client-side, the excessive outage time can lead to application failures, which can negatively impact any service level agreements tied to the system availability. Using the embodiments described herein, the application failures may be reduced by reducing the outage time of the storage server in either the reboot context or the failover context.

It should be noted that LUN, as used herein, refers to a data storage unit of a storage system, such as a logical data container, as opposed to an identifier of the data storage unit. It should also be noted that the term thread, as used herein, refers to a thread of execution within a program. Threads are a way for a program to split itself into two or more simultaneously running tasks.

Storage Network Environment

FIG. 1 illustrates a block diagram of one embodiment of an environment including a CFO system configuration. The CFO system configuration includes a pair of storage servers 2A and 2B coupled by a dedicated cluster interconnect 5. In other embodiments, the storage servers 2A and 2B could be coupled through a non-dedicated interconnect, such as through the network 3. The storage server 2A is coupled to storage devices 4A, which includes multiple storage devices (e.g., disks). The storage server 2B is coupled to storage devices 4B, which includes multiple storage devices (e.g., disks). The storage servers 2A and 2B are also coupled through a network 3 to a number of storage clients 1 (hereinafter simply "clients"). The storage devices 4A and 4B are managed by the storage servers 2A and 2B. The storage servers 2A and 2B receive and respond to various read and write requests from the clients 1, relating to volumes, directories, LUNs, files, blocks and/or other units of data stored in (or to be stored in) the storage devices 4A and 4B. Either of the storage servers 2A and 2B may be a processing system that is configured to store and retrieve data on behalf of one or more client processing systems, such as the clients 1. In the context of NAS, the storage server may provide file level access to data, which is sometimes called a "filer." In one embodiment, either or both of the storage servers 2A and 2B are storage servers, made by Network Appliance, Inc. of Sunnyvale, Calif. In a SAN context, the storage server provides clients with block-level access to stored data, rather than file-level access. Some storage servers are capable of providing clients with both file-level access and block-level access, such as certain storage servers made by Network Appliance, Inc. of Sunnyvale, Calif.

Each of the clients 1 may be, for example, a conventional personal computer (PC), workstation, or the like. The clients 1 may be general-purpose computers configured to execute software applications. Each client 1 may communicate with the storage servers over the network 3 by exchanging data according to pre-defined protocols, such as Transmission Control Protocol/Internet Protocol (TCP/IP). Moreover, the client 1 may interact with the storage servers in accordance with a client/server model of information delivery. That is, the client may request the services of the storage system, and the system may return the results of the services requested by the client, by exchanging data over the network 3. The clients 1 may issue commands and data using file-based access protocols, such as the Common Internet File System (CIFS) protocol or Network File System (NFS) protocol, over TCP/IP when accessing information in the form of files and directories. Alternatively, the client may issue commands and data using block-based access protocols, such as the Small Computer Systems Interface (SCSI) protocol encapsulated over TCP (iSCSI) and SCSI encapsulated over Fibre Channel Protocol (FCP), when accessing information in the form of blocks.

The storage servers 2A and 2B may be, for example, a file server used in a NAS mode (e.g., a "filer"), a block-based storage server such as used in a storage area network (SAN), a storage server which can perform both file-level access and block-level access for clients, or another type of storage server, such as a network routing device configured to provide storage services. The network 3 may be, for example, a local area network (LAN), a metropolitan area network (MAN), a virtual private network (VPN), a wide area network (WAN), a global area network (GAN) such as the Internet, or other type of network or combination of networks. The network 3 may implement, for example, Ethernet protocol, FCP, or another protocol or a combination of protocols.

The storage devices 4A and 4B may store data represented in an active file system of the storage servers 2A and 2B. The storage devices in the storage devices 4A and 4B may be, for example, conventional magnetic disks, optical disks such as CD-ROM or DVD based storage, magneto-optical (MO) storage, or any other type of non-volatile storage devices suitable for storing large quantities of data. The storage devices in the storage devices 4A and 4B can be organized as one or more RAID groups, in which case the storage servers 2A and 2B access the storage devices 4A and 4B using an appropriate RAID protocol. A file system is a hierarchy of the stored data sets. A file system includes directories and files. A file system layer or manager is an application-level programmatic entity or layer which imposes the hierarchal structure on the data sets, such as the files, directories and/or other data containers stored and/or managed by a storage server, and which services read and write requests from clients of the storage server. A LUN may be a virtual partition of a RAID group. For example, a LUN may be formed as a "stripe" that is one or more blocks wide, across the storage devices in a RAID group, where a block may be, for example, a 4 Kbyte chunk of storage space. A LUN may appear to a client, for practical purposes, as a physical storage device such as a disk.

Storage of information is preferably implemented as one or more storage "volumes", each of which includes a set of one or more physical disks managed cooperatively to define an overall logical arrangement of disk space on the volume(s). A volume is a logical data set which is an abstraction of physical storage, combining one or more physical storage devices or parts thereof into a single logical storage object (e.g., data storage unit), and which is managed as a single administrative unit, such as a single file system. Each volume is generally, although not necessarily, managed as a separate file system. Typically file systems have a one to one mapping to volumes where volumes can be constructed from one or more storage devices (e.g., disks). Typically, a volume management layer, which is separate from the file system layer, handles the arrangement of storage devices and provides the appearance that a single volume exists to the file system layer. Each storage server and the volumes it manages are hereinafter referred to as a node. Each volume stores a copy of a data set, and each storage server has its own data sets as well as has access to the other storage server's data sets. It should be understood that while only two storage servers are shown in the illustrative CFO configuration, it is expressly contemplated that multiple storage systems and volumes may be connected in a cluster configuration and provide takeover for each other.

Each storage server includes multiple data access ports that enable the system to connect to multiple storage loops. Each storage server includes port connectors that couple to the disks over an I/O interconnect arrangement. Each storage server is connected to both its volumes and the volumes of its "partner" storage system over the storage loops.

In accordance with failover methodologies, should a storage server in a CFO configuration fail, the partner storage server initiates a takeover of the volume(s) that are normally serviced by the failed storage server. Thus, for example, if storage server 2A should fail, then storage server 2B would take over the operations and service data access requests to those volumes normally serviced by storage server 2A. It should be noted that the network topology is exemplary only and that the principles of the present invention can be implemented using a variety of storage network configurations. That is, it is expressly contemplated that alternate storage network topologies may be utilized, e.g., via switches, using external RAID boxes, etc.

Figure 2:
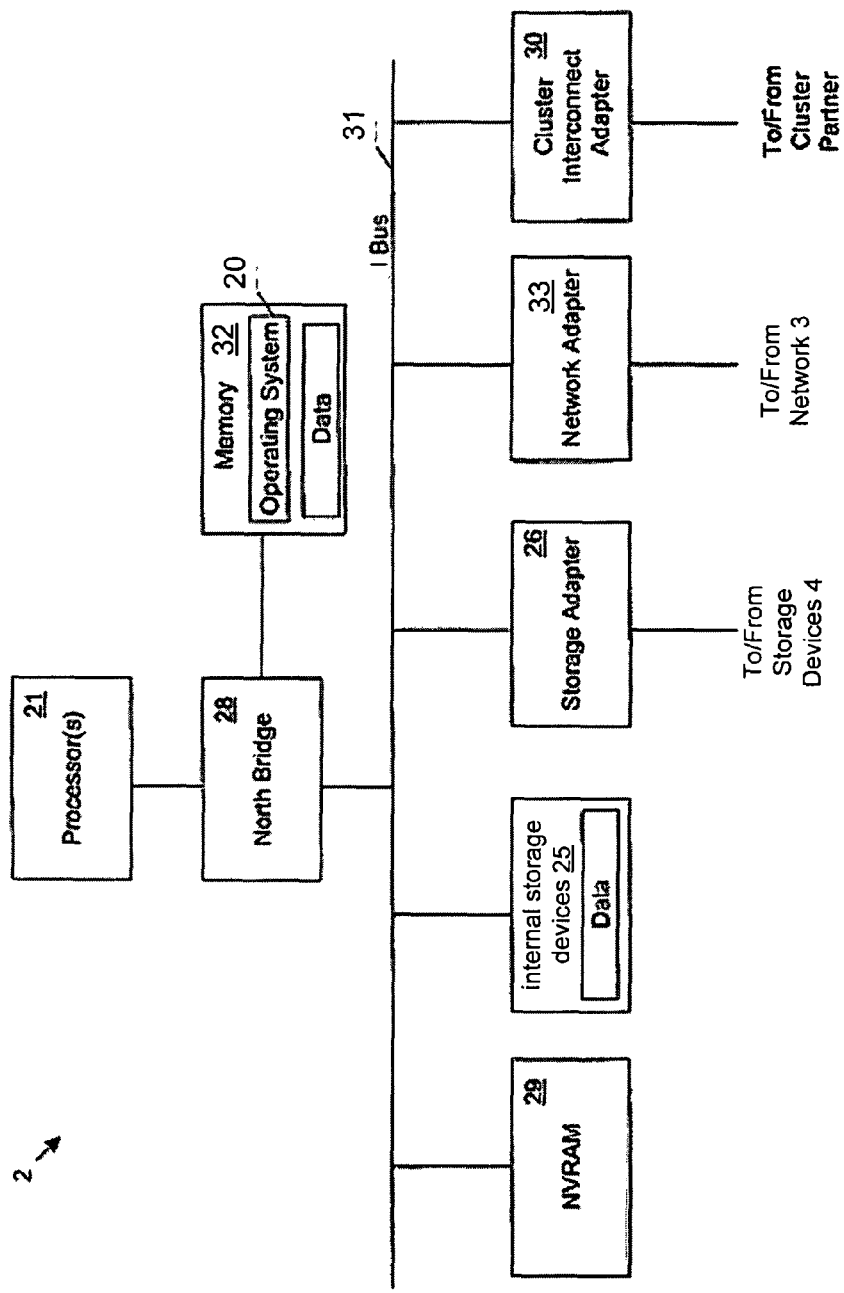
FIG. 2 illustrates a block diagram of one embodiment of the architecture of either of the storage servers in FIG. 1.

FIG. 2 illustrates a block diagram of one embodiment of the architecture of a storage server such as shown in FIG. 1. The storage server of FIG. 2 can represent either the storage server 2A or storage server 2B. The storage server 2 includes one or more processors 21 and a system memory 32 coupled to each other by a north bridge 28. The north bridge 28 is also coupled to a bus 31 (e.g., Peripheral Component Interconnect (PCI) bus). The north bridge 28 provides an interface between peripheral components on the bus and the processors 21 and system memory 32.

Each processor 21 is a central processing unit (CPU) of the storage server 2 and, thus, controls the overall operation of the storage server 2. In certain embodiments, a processor 21 accomplishes this by executing software stored in system memory 32. Such software may include the operating system 20 of the storage server 2. Each processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. The system memory 32 is a random access memory (RAM) which stores, among other things, the operating system 20 of the storage server 2, in which the techniques introduced herein can be implemented.

Connected to the bus 31 are an NVRAM 29; one or more internal storage devices 25; a storage adapter 26; a network adapter 33; and a cluster interconnect adapter 30. The NVRAM 29 is configured to store information about the storage server and associated storage devices. It should be noted that NVRAM 29 may serve a special purpose in the operating system. The NVRAM 29 is tightly integrated into the write I/O data path so that modifications to the file system are logged into NVRAM such that in the event of a power outage, the modifications before the outage event that are preserved in the NVRAM 29 can be replayed once the system is rebooted. In a cluster configuration, file system modifications are atomically logged both in the local node's NVRAM as well as the partner node's NVRAM so that when a failover occurs, the partner node can replay any I/O requests which may have been logged in the local nodes NVRAM before it went down.

Internal storage devices 25 may be or include any conventional medium for storing large volumes of data in a non-volatile manner, such as one or more disks. The storage adapter 26 allows the storage server 2 to access the external storage devices 4 and may be, for example, a Fibre Channel adapter, a SCSI adapter, or the like. The network adapter 33 provides the storage server 2 with the ability to communicate with remote devices such as the clients 1 over a network and may be, for example, an Ethernet adapter, or the like. The cluster interconnect adapter 30 provides the storage server 2 with the ability to communicate with its cluster partner. In certain known implementations, the cluster interconnect adapter 30 complies with the InfiniBand Architecture Specification, Release 1.1, Nov. 6, 2002, to communicate with the cluster partner, and more specifically, to communicate with the cluster partner using Remote Direct Memory Access (RDMA) or InfiniB and Send/Receive operations. It should also be noted that the cluster interconnect adapter may also be implemented in the same physical components as the storage or network adapters 26 and 33.

Figure 3A:
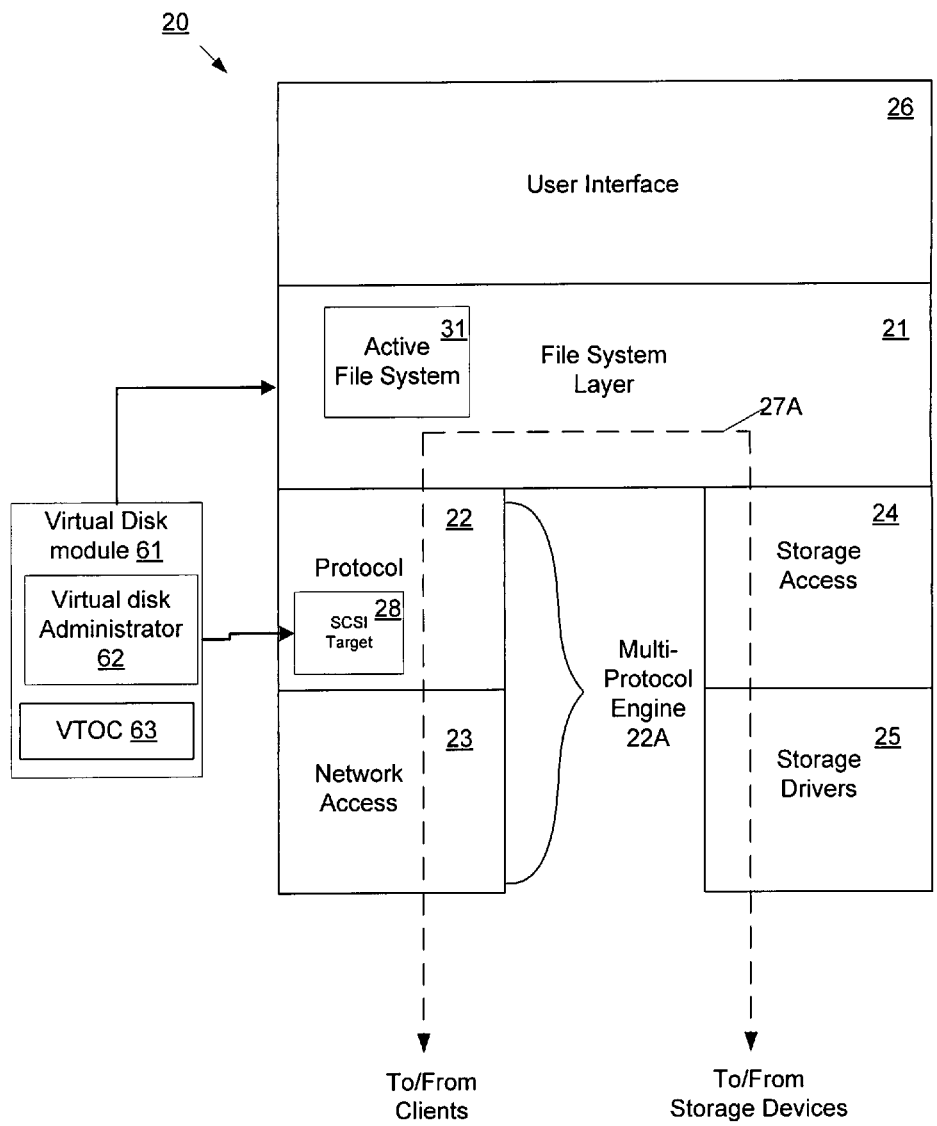
FIG. 3A illustrates one embodiment of the architecture of the operating system of either of the storage servers in FIG. 1.

FIG. 3A shows one embodiment of the architecture of the operating system of the storage server 2. As shown, the operating system 20 includes several software modules, or "layers". These layers include a file system layer 21. The file system layer 21 is an application-level layer which imposes a structure, e.g. a hierarchy, on files and directories and/or other data containers stored by the storage server 2 and which services read/write requests from clients 1, among other functions. This hierarchy is referred to as the "active file system" 31. Logically "under" the file system layer 21, the operating system 20 also includes a protocol layer 22 and an associated network access layer 23 to allow the storage server 2 to communicate over the network 3 (e.g., with clients 1). The protocol layer 22 implements various higher-level network protocols, such as Network File System (NFS), Common Internet File System (CIFS), Hypertext Transfer Protocol (HTTP), Fibre Channel Protocol (FCP), Internet SCSI (iSCSI), and/or other Upper Layer Protocols (ULP). In addition, assuming the storage server 2 is configured to operate in a SAN, the protocol layer 22 can also include a SCSI target layer 28, to enable the storage server 2 to receive and respond to SCSI I/O operations (i.e., read and writes). For block level access, the protocol layer 22 may be split in half where the bottom half represents the transport protocols iSCSI and FCP, and the top half is the common SCSI target layer. The network access layer 23 includes one or more drivers which implement one or more lower-level protocols to communicate over the network, such as Ethernet, or TCP/IP. The network access layer may include the TCP/IP stack as well as the lower level data link layer which includes the physical interfaces like Ethernet, a host bus adapter (HBA) which may provide a Fibre Channel interface, or the network adapter 33. The protocol layer 22 and the network access layer 23 can be collectively referred to as a multi-protocol engine 22A. In one embodiment, the storage server is a Filer, made by Network Appliance, Inc. of Sunnyvale, Calif., that is multi-protocol capable because the Filer can provide data access simultaneously through all of the data access protocols (e.g., NFS, CIFS, iSCSI, FCP, or the like) available in the protocol layer 22. Alternatively, other types of storage servers may be used.

Also logically under the file system layer 21, the operating system 20 includes a storage access layer 24 and an associated storage driver layer 25, to allow the storage server 2 to communicate with the storage devices 4. The storage access layer 24 implements a higher-level disk storage protocol, such as an implementation of RAID, while the storage driver layer 25 implements a lower-level storage device access protocol, such as FCP or small computer system interface (SCSI). Also shown in FIG. 2 is the path 27A of data flow, through the operating system 20, associated with a read or write operation.

The operating system 20 also includes a user interface layer 26 logically on top of the file system layer 21. The user interface layer 26 may provide a command line interface (CLI) and/or a graphical user interface (GUI) to various storage server functions, to allow an administrator to manage the storage server 2.

The storage server 2 has an active file system 31, which is created and managed by the file system layer 21 of the operating system 20. The active file system 31 includes a volume which includes one or more LUNs. The active file system 31 is the user accessible interface to the volume. However, the appearance that multiple volumes reside under a single file system root is possible. In one embodiment, this type of view of multiple volumes residing under a single file system can be provided using Data ONTAP® software, available from Network Appliance, Inc. of Sunnyvale, Calif. For example, the common root path from which all volumes can be accessed can be indicated by /vol (e.g., /vol/vol0, /vol/volA, or /vol/volB). In another embodiment, another level of indirection can be provided which allows the creation of pools of storage, called aggregates. These aggregates are containers which can hold multiple volumes, otherwise known as flexible volumes, such as FlexVol® volumes, available from Network Appliance, Inc. of Sunnyvale, Calif. It will be recognized that each volume or LUN can contain different data from that in any other volume or LUN, although data contained in the volumes and LUNs can also be duplicated in other volumes or LUNs. Each volume represents a set of one or more physical storage devices, such as disks. A LUN is a data storage unit (e.g., a logical data container) that is exported to a client 1 and which, from the perspective of a client 1, appears to be a storage device, such as a disk. However, each LUN is actually stored as a file in the active file system 31 and is striped across multiple physical storage devices according to a RAID protocol.

The operating system 20 also includes a virtual disk module 61. The virtual disk module 61 includes a virtual disk administrator 62, which is a thread of execution that controls and/or coordinates much of the functionality of the parallel initialization process described herein. The virtual disk module 61 also includes a virtual disk table of contents (VTOC) 63, which contains the authoritative list of all the LUNs in a volume. There is one VTOC 63 per volume. The VTOC 63 is contained as part of the volume metadata. The VTOC 63 contains a header segment and LUN entries for each of the LUNs in the volume. The VTOC 63 is updated with a VTOC entry at LUN creation time. Each VTOC entry contains information that is used to construct the file handle. The file handle is the object which is used to locate the LUN that resides in the file system. The VTOC entries may also include various status flags, which are kept in the entries for reference. The status flags may indicate the current state of the LUN. The virtual disk module 61 performs read I/O requests to the active file system 31 to access the information contained with the VTOC 63. Each VTOC 63 includes a separate entry for each LUN within that volume. The SCSI target layer 28 may also maintain an in-core list of all LUNs in a volume, however, this may not be the same as a cached copy of the VTOC 63. As described above, a LUN may represent data on a physical disk drive or data of a virtual disk. The virtual disk or LUN may be physically represented as a regular file in the active file system, which in turn is treated specially by the operating system. Representing LUNs as files decouples the LUN from the computer hardware, such as a disk drive. This allows the storage server to support an arbitrarily large number of LUNs even when the system may have far fewer physical disks. This ability to support a large number of LUNs exposes limitations discussed below with respect to conventional methods of on-lining LUNs.

Any request from a client 1 to read or write a LUN or to initialize a LUN may be passed to the SCSI target layer 28 and includes (among other things) a LUN identifier (ID). The way in which a read or write SCSI request reaches the appropriate LUN is through a nexus which is an association between the initiator, target, and LUN. The information to derive the nexus is contained in the SCSI request which gets passed to the SCSI target layer 28. As noted above, each LUN is stored in the form of a file within a corresponding volume in the active file system 31.

Figure 3B:
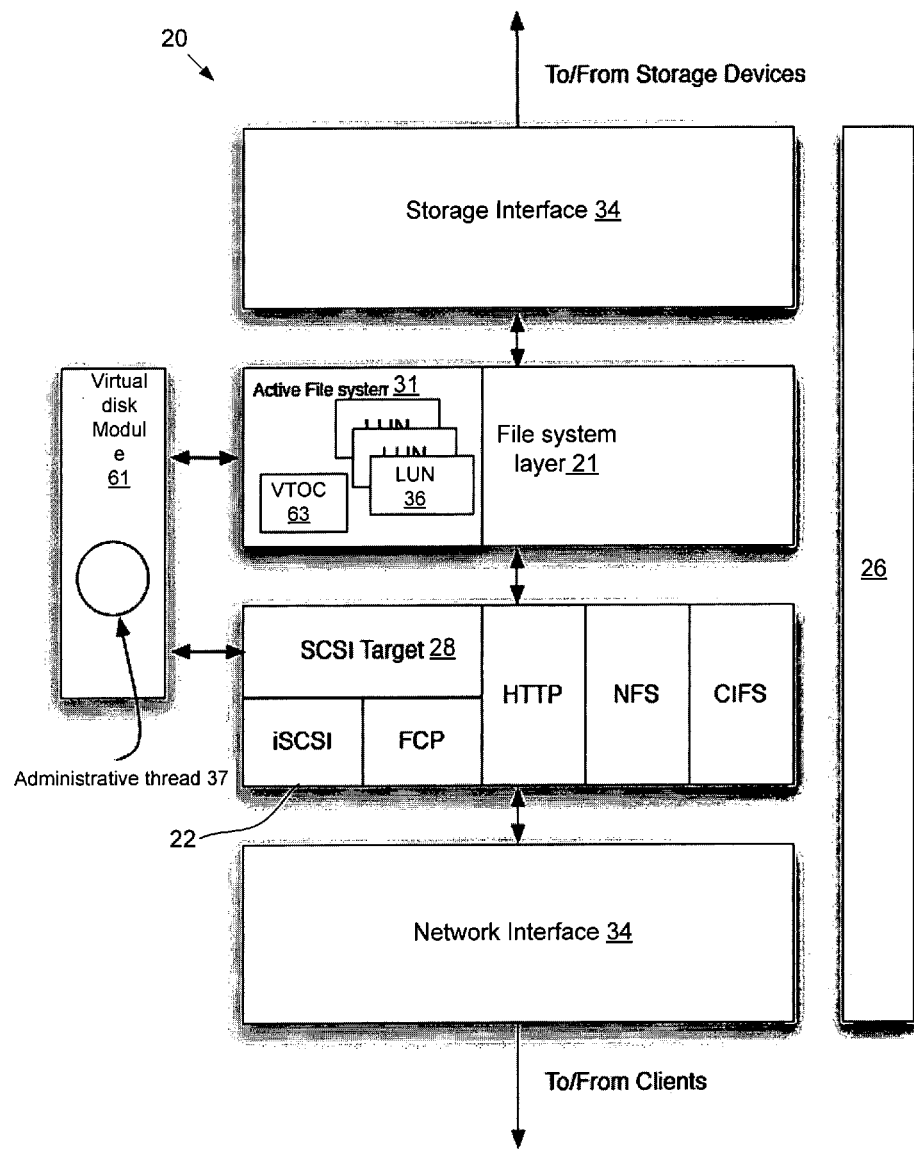
FIG. 3B illustrates another embodiment of the architecture of the operating system of either of the storage servers in FIG. 1.

FIG. 3B illustrates another embodiment of the architecture of the operating system of either of the storage servers in FIG. 1. FIG. 3B shows the layering of the operating system 20 and the virtual disk module 61. In one embodiment, the operating system 20 is Data ONTAP®, available from Network Appliance, Inc. of Sunnyvale, Calif. The operating system 20 of FIG. 3B includes a network interface 34 through which the operating system 20 communicates with one or more clients 1 through network 3, and a storage interface 35 through which the operating system 20 communicates with one or more storage devices. The operating system 20 also includes file system layer 21 which manages the active file system 31. The active file system 31 includes multiple LUNs 36. In this embodiment, the VTOC 63 is stored in the active file system.

The operating system 20 also includes the protocol layer 22, which includes SCSI target layer 28, iSCSI, FCP, HTTP, NFS, and CIFS protocols, user interface 26 (e.g., CLI), as described above with respect FIG. 3A. The virtual disk module 61 is coupled to the file system layer 21 as well as the protocol layer 22. The virtual disk module 61 includes the administrative thread 37, and multiple worker threads, as described in more detail below.

Parallel Initialization

Figure 4:
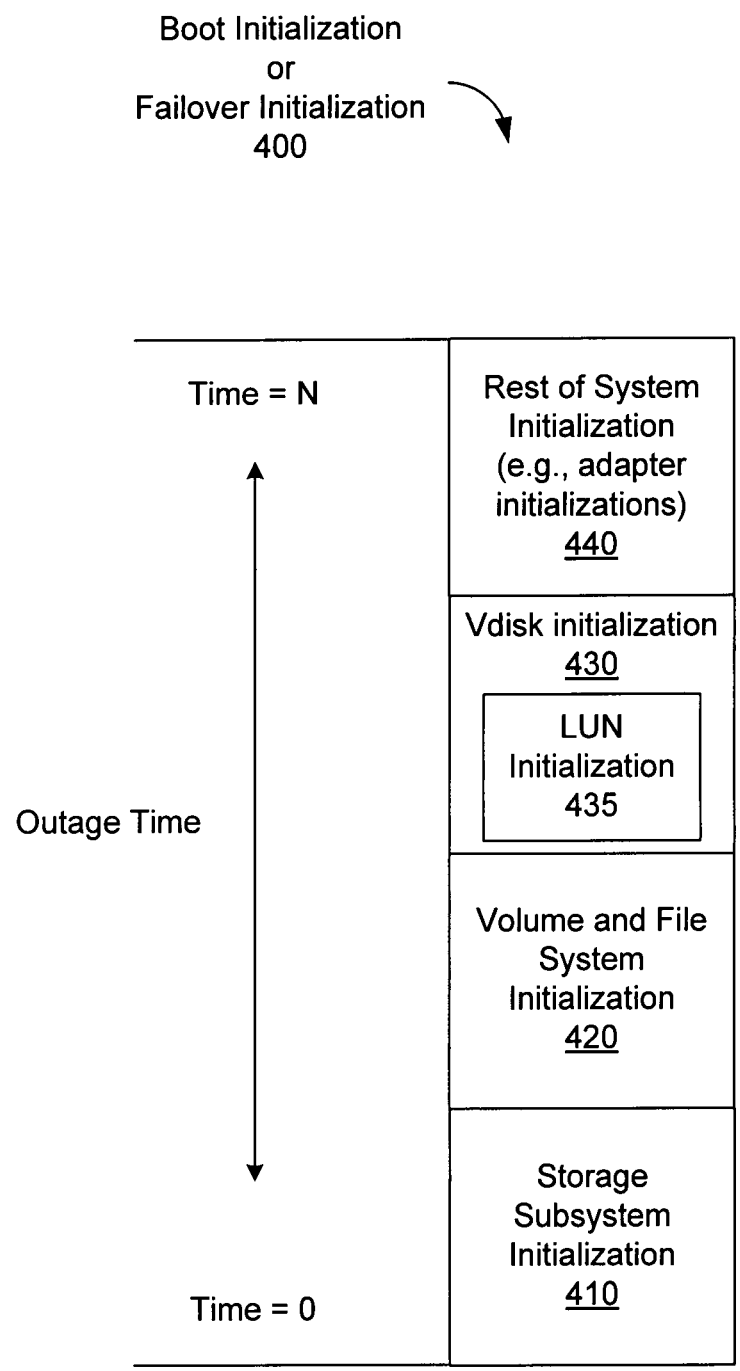
FIG. 4 illustrates a timing diagram of a boot initialization or failover initialization process.

FIG. 4 illustrates a timing diagram of a boot initialization or failover initialization process 400. Boot initialization or failover initialization process 400 includes a total outage time 401. The outage time 401, as described above, is the time the storage server is unable to serve data in the boot or failover context. The outage time 401 can be measured from the time (e.g., Time=0) the storage server becomes unavailable due to failover or rebooting from a system crash until the time (e.g., Time=N) that the storage server becomes able to serve data (e.g., the LUNs are back on-line for data access). The initialization process 400 includes multiple operations, such as storage subsystem initialization 410, volume and file system initialization 420, virtual disk initialization 430, which include initialization of LUNs of the file system 435, and the initialization of the rest of the system 440, such as adapter initializations. As described above, using the illustrative embodiments described herein, the initialization process 400 may be reduced by reducing the time for the virtual disk initialization 430, in particular, the LUN initialization 435. It should be noted that although the boxes have been illustrated as having similar sizes, the operations of the initialization process 400 have not been drawn to scale. In certain configurations, the virtual disk initialization 430 consumes the most time of the initialization process 400.

Figure 5A:
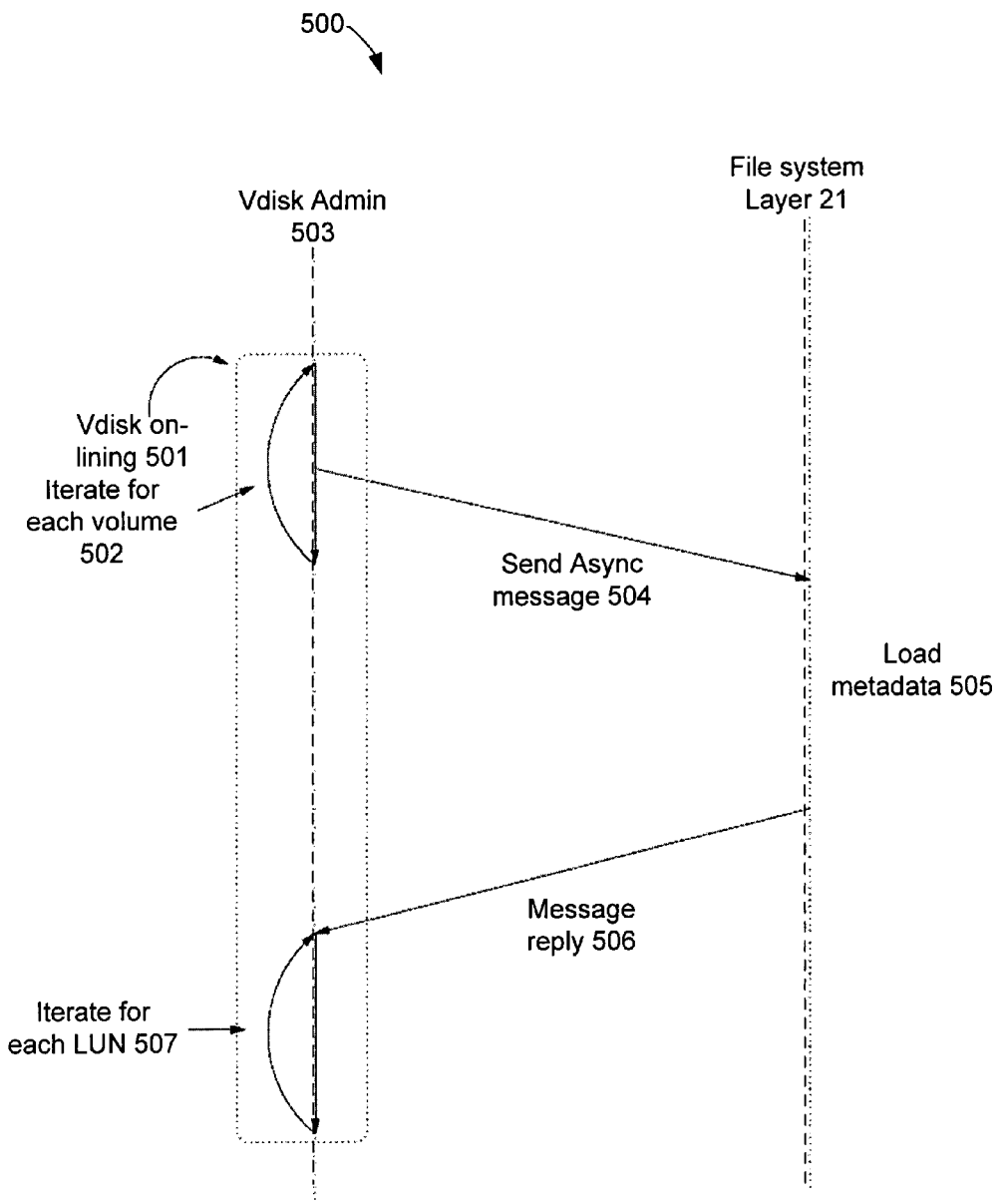
FIG. 5A illustrates a single administrative thread configured to perform serially the initialization tasks of the initialization process.
Figure 5B:
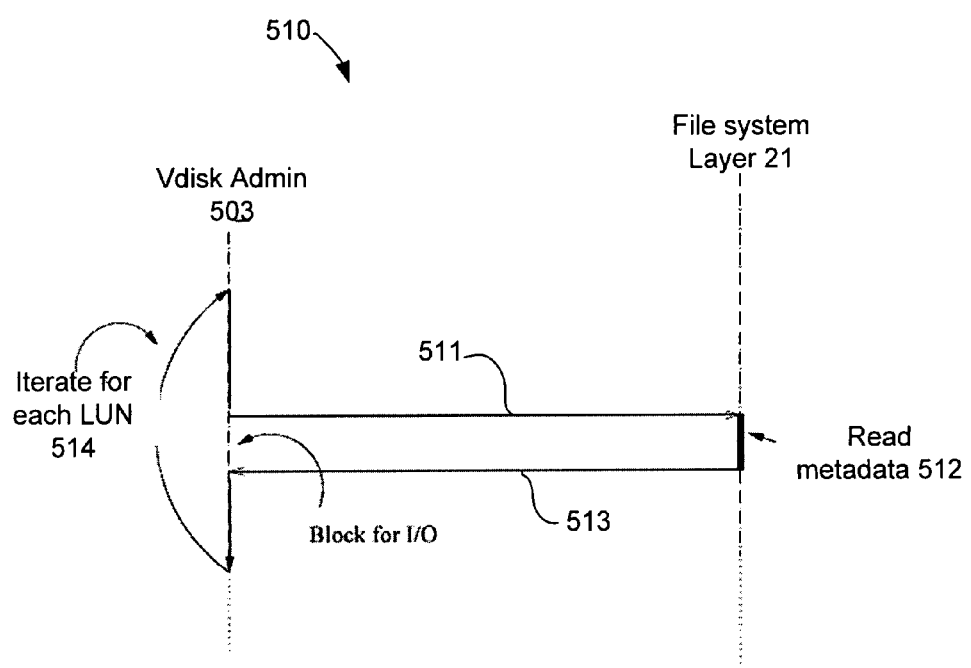
FIG. 5B illustrates the single administrative thread that is configured to perform serially a particular initialization task for each LUN.
Figure 5C:
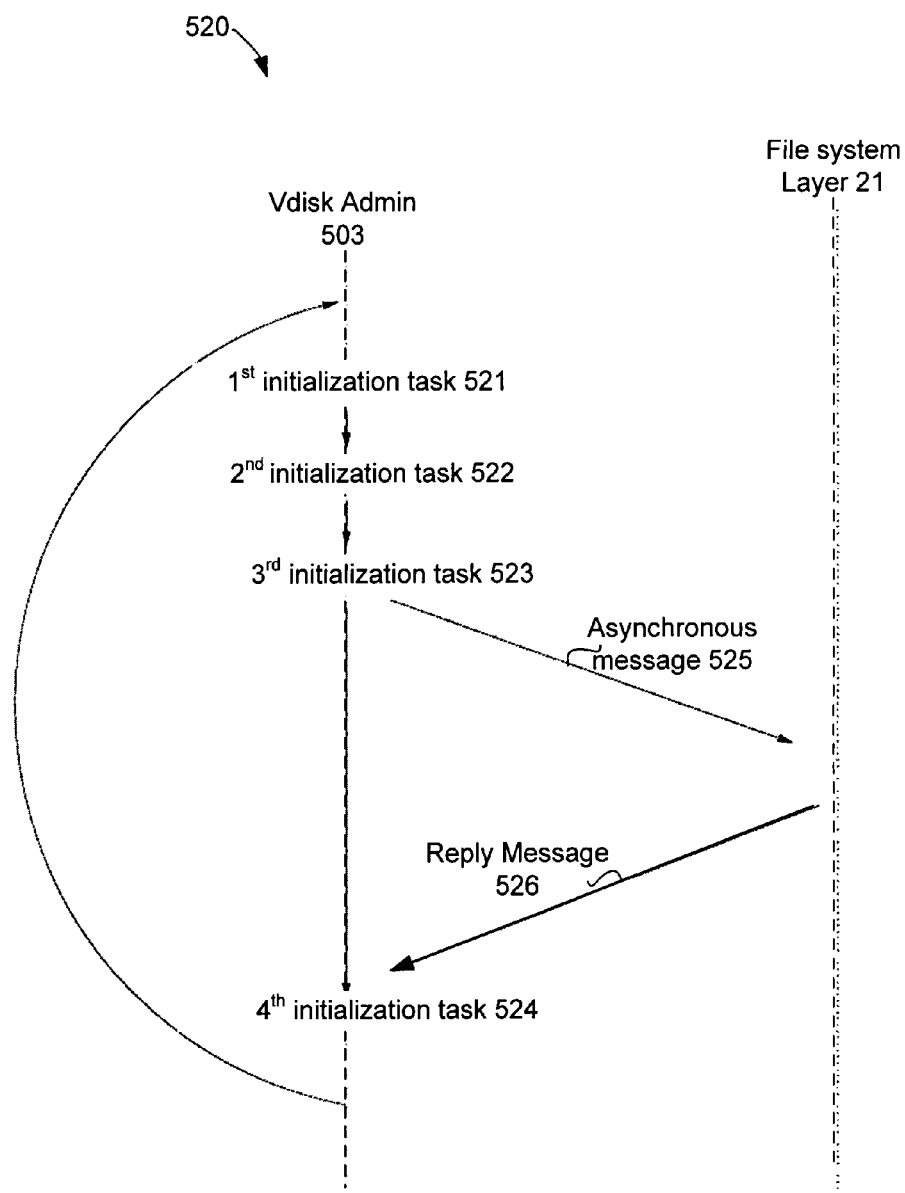
FIG. 5C illustrates the single administrative thread that is configured to perform serially additional initialization tasks of the initialization process for each LUN.
Figure 11:
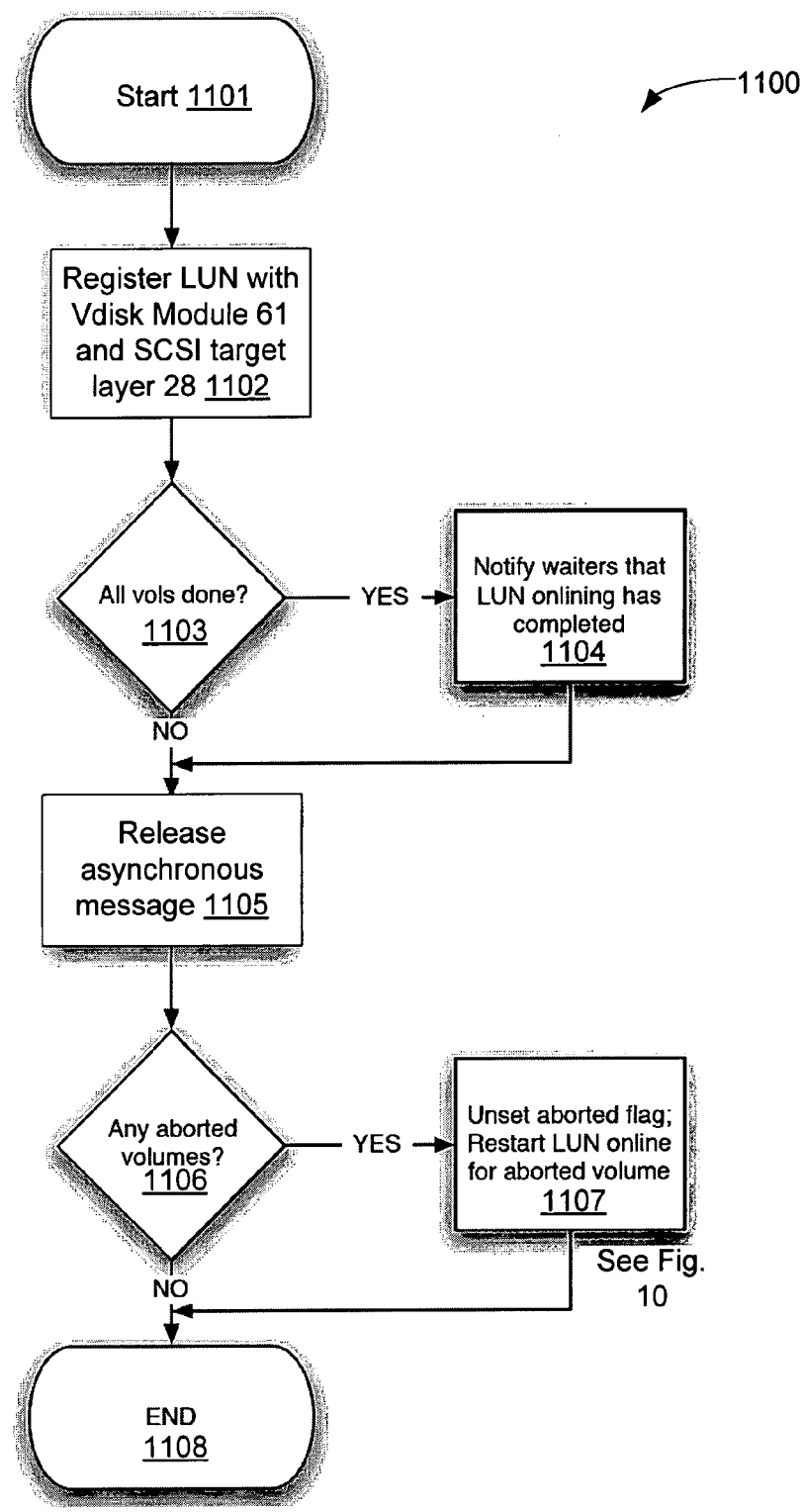
FIG. 11 illustrates one embodiment of a flow chart of the completion of the initialization of the LUNs procedure.

FIGS. 5A-5C illustrate a conventional method for initializing multiple LUNs of multiple volumes. FIG. 5A illustrates a single administrative thread 503-configured to perform serially initialization tasks of an initialization process 500. In particular, the initialization process 500 includes initializing a virtual disk on-lining procedure 501 for initializing multiple LUNs of multiple volumes. This on-lining procedure 501 includes executing a single administrative thread 503 (e.g., virtual disk administrative thread) to perform various initialization tasks in series. The virtual disk on-lining procedure includes serially iterating through each volume using the single administrative thread 503, operation 502. It should be noted that operation 502 is a LUN discovery process in which each VTOC for each volume is read to determine the number of LUNs as well as their locations. It should be noted that there may be one VTOC for each volume; however, there is one VTOC read call per LUN during the initialization of each LUN of the volume. For example, if the volume contains ten LUNs, there will be ten VTOC reads issued to the file system layer at the correct offsets to obtain the information to construct the file handle for each LUN. The location of the LUN is determined by the respective file handle. For each volume the VTOC 63 is examined for each LUN and the number of LUNs 36 contained in the volume may be obtained. Then for each LUN, an asynchronous message 504 is sent to the file system layer 21. The VTOC examination and asynchronous message operations occur in pairs; for each LUN, the VTOC is read and an asynchronous message is sent before moving to the next LUN, as illustrated in FIG. 5B. For example, the VTOC entry corresponding to the particular LUN is read to obtain information that is used to construct the file handle, which is used to locate the LUN that resides in the file system. When the file system layer 21 receives the asynchronous message 504 for each LUN, metadata 505 (e.g., file handle)

regarding the LUN is loaded. This may be done using a file system layer thread in the file system layer 21. After loading the metadata 505, the file system layer 21 sends a message reply 506 back to the virtual disk administrative thread 503 to acknowledge that the file system layer 21 is done loading the metadata 505. The initialization process 501 also includes serially iterating through each LUN 507. The operation performed in operation 507 is represented in FIG. 11, which is where the LUN registration occurs. For example, operation 1102 of FIG. 11 is where the LUN is both registered with the virtual disk module 61, as well as with the SCSI target layer 28, making it available for data access. Everything preceding this operation is in preparation for the on-lining process.

FIG. 5B illustrates the single administrative thread 503 that is configured to perform serially a particular initialization task 510 for each LUN 36 of the operation 502 of FIG. 5A. Before the asynchronous message is sent to the file system layer 21 in operation 504, the administrative thread 503 first obtains the file handle for the LUN 36 so that the file system layer 21 can properly locate the LUN. In order to obtain the file handle for the LUN, the VTOC 63 metadata 512 is read by the file system layer 21 in order to obtain the file handle for the LUN. The single administrative thread 503 is configured to send a command 511 to the file system layer 21 to read metadata 512. Command 511 is a synchronous command which means that administrative thread 503 is halted while the command 511 is being processed by the file system layer 21. While halted, the administrative thread 503 is blocked for I/O access, which means that the thread of control which issued the request cannot make forward progress until the I/O operation completes. As such, the administrative thread 503 is waiting or blocked on the I/O operation. After the file system layer 21 has read the metadata 512, since the command 511 is synchronous, a reply 513 from the file system layer 21 is implicit in the completion of the command. File system layer 21 does not explicitly send a reply message back to the administrative thread. Once the command 511 has been completed by the file system layer 21, the administrative thread 503 can resume further processing. This initialization task 510 is serially iterated for each LUN 514 of a volume.

FIG. 5C illustrates the single administrative thread 503 that is configured to perform serially additional initialization tasks 520 of the initialization process 500 for each LUN. The single administrative thread 503 is configured to perform the additional initialization tasks 520, which include a first initialization task 521, a second initialization task 522, and a third initialization task 523. The first initialization task 521 is to determine the number of LUNs (N) in the current volume. The first initialization task 521 is the outer loop of operation 502, as it is a per-volume task. The second initialization task 522 is to read the VTOC information (e.g., file handle information for LUN) by accessing each LUN entry in the VTOC. This second initialization task 522 is iteratively performed through all the LUNs of each volume. The third initialization task 523 is preparing to send an asynchronous message 525 to the file system layer 21. The single administrative thread 503 sends the asynchronous message 525 to the file system layer 21 when the third initialization task 523 is completed. The tasks 522, 523, and 525 are in the inner loop of the operation 502 of FIG. 5A, since the tasks are LUN related tasks. The file system layer 21 receives the asynchronous message 525 to load LUN metadata, such as the file handle that is used to locate the LUN that resides in the file system. When the file system layer 21 has completed its initialization tasks that correspond to the LUN metadata, the file system layer 21 sends a backdoor reply message, reply message 526 to the single administrative thread 503 to acknowledge that the file system layer 21 is finished. The backdoor message is a message type which provides an interface for subsystems in the operating system (e.g., Data ONTAP® software, available from Network Appliance of Sunnyvale, Calif.), to interact with the file system layer of the operating system. Typically, the file system layer requests process user data and there is a well-defined set of operations that can be performed. In certain cases, the operating system itself may utilize file system services in order to accomplish a certain task. The calling subsystem defines a "backdoor handler" to perform a specific task which the file system layer can execute on behalf of the calling subsystem. The backdoor message includes a pointer to the backdoor handler that is received by the file system layer.

After the single administrative thread 503 receives the reply message 526, the single administrative thread 503 performs a fourth initialization task 524. The fourth initialization task 524 includes performing any additional initialization tasks to complete the initialization process of preparing the current LUN for data access. The fourth initialization tasks may include registering the LUN with the virtual disk module 61 and the SCSI target layer 28, allowing the LUN to be ready for data access (e.g., on-line). Initialization tasks 521-523 are preformed independently of initialization task 524. Initialization tasks 521-523 are an amount of work that is performed serially that is not dependent on initialization task 524, which is a separate amount of work that is performed serially. LUN on-lining can be broken down into two main parts, the preparation of the LUNs to be registered, and the registration of the LUNs. Initialization tasks 521-523 are performed as preparatory tasks while initialization task 524 is where the registration of the LUN occurs. After these initialization tasks 521-524 have been performed for the current LUN, the next LUN is selected, and the initialization tasks 521-524 are performed for the next LUN. Initialization tasks 524 constitute operation 507 of FIG. 5A. Also, when the volume is finished, the subsequent volumes are selected iteratively (e.g., operation 502), and the initialization tasks 521-523 are performed iteratively through each of the LUNs in each volume, and initialization task 524 is performed once the asynchronous reply 526 has been received from the file system layer 21.

As described above, since this serialization in initializing the LUNs of FIGS. 5A-5C uses only one single administrative thread (e.g., virtual disk administrative thread 503) to perform the initialization tasks (e.g., 510, 521-524), each initialization task is queued at this single thread, and since the single administrative thread 503 only processes one initialization task at a time, the single administrative thread creates a processing bottleneck with file systems with large number of LUNs. The embodiments introduced herein are configured to use both an administrative thread and multiple worker threads (N) to process the LUN on-lining work in parallel at both the volume level and the LUN level. When the administrative thread receives the message to start the initialization, the administrative thread assigns the work for reading the VTOC information for all of the LUNs in a volume to one or more worker threads and simply moves on to perform additional initialization tasks. It should be noted that the work each worker thread is assigned here are the initialization tasks similar to the initialization tasks 522 and 523 of FIGS. 5A-5C. However, N worker threads work on N volumes in parallel. These worker threads then independently send messages (e.g., asynchronous messages) to the file system layer 21, and once the file system layer 21 is done loading the required buffers, the file system layer 21 sends replies back to the administrative thread. The administrative thread then again assigns work to the worker threads to finally bring the LUNs on-line, such as registering each LUN with the SCSI target layer 28 and preparing the LUN for data access by external clients 1. The worker threads may be implemented in a generic manner in order to offload some additional administrative work that is typically performed by the administrative thread, for example, all of the information displayed on the console could be offloaded to the worker threads so that the administrative thread is free to process other messages in its queue. In other words, there is nothing specific about the worker threads which would prevent the worker threads from being used for other virtual disk administrative tasks that could be assigned by the administrative thread. For example, as described herein, the worker threads are being utilized to speed up the LUN on-lining process, but other embodiments are possible to perform other tasks such as displaying LUN related console output. The console output may be a screen that is directly attached to the storage server or a display that may be accessed over the network using a protocol, such as TELNET or the like.

Figure 6A:
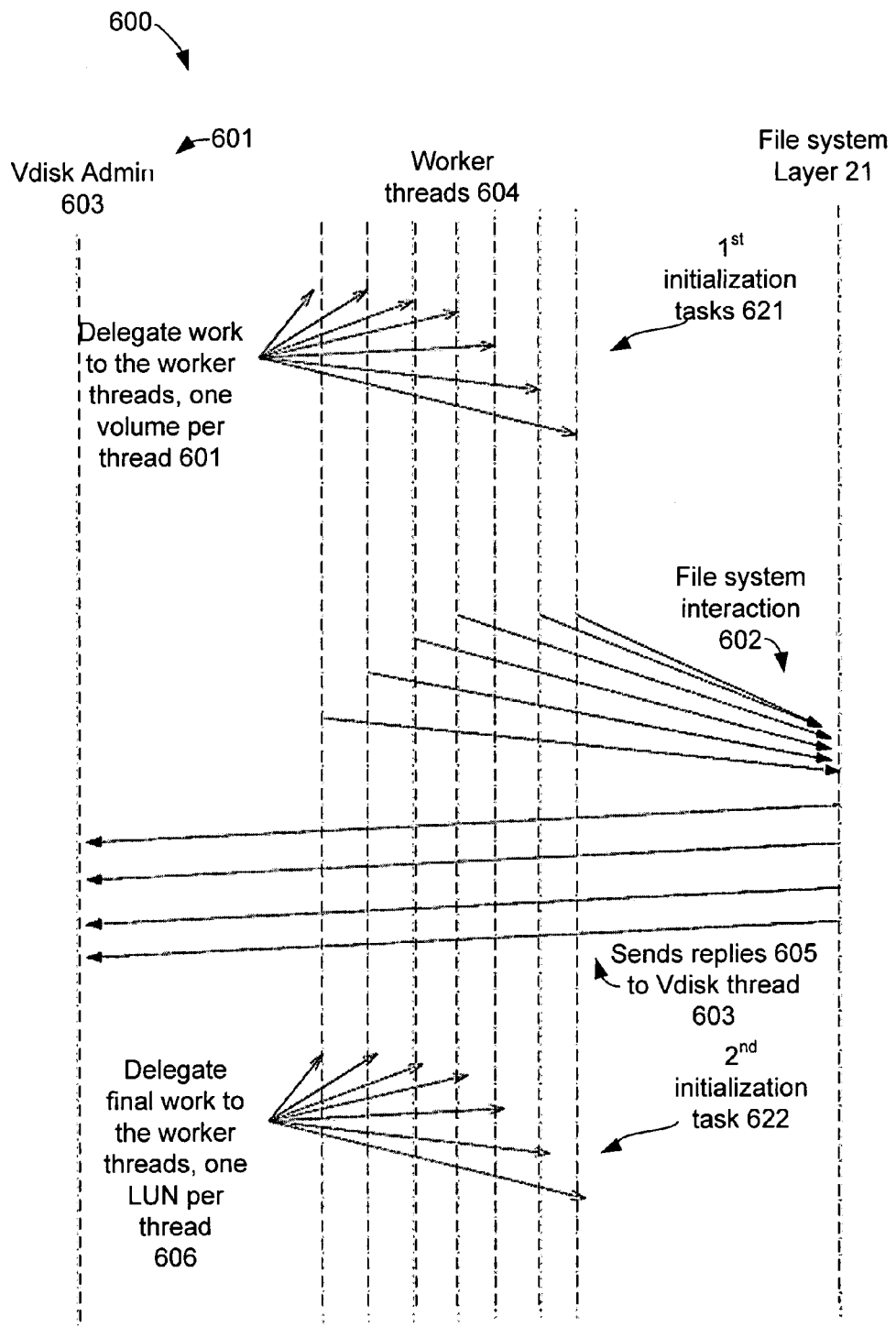
FIG. 6A illustrates one embodiment of an administrative thread and multiple worker threads that are configured to perform initialization tasks of an initialization process in parallel.
Figure 6C:
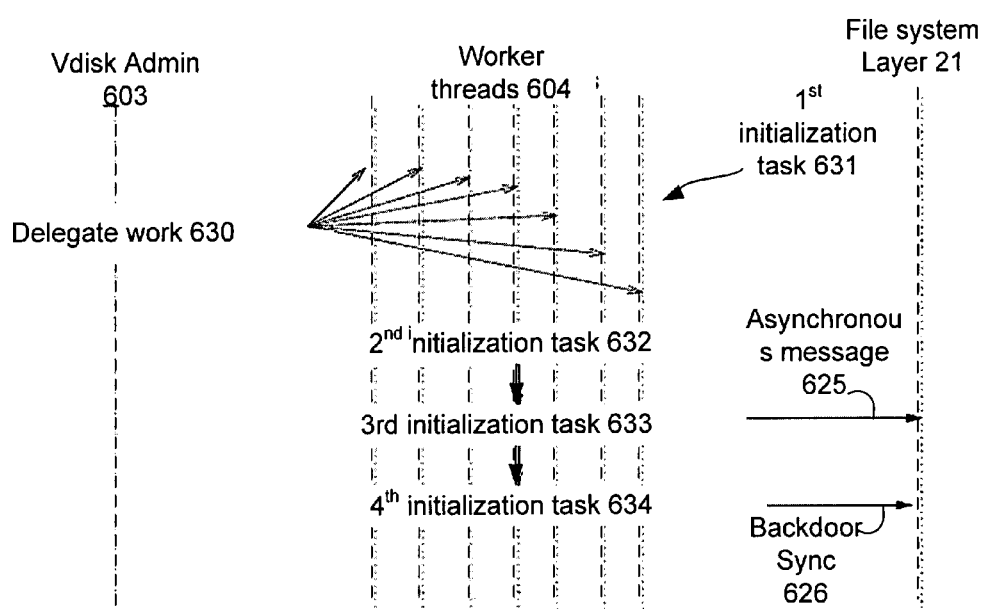
FIG. 6C illustrates one embodiment of the administrative thread and the multiple worker threads that are configured to perform additional initialization tasks of the initialization process in parallel.

FIGS. 6A-6C illustrate one embodiment of a method for initializing multiple LUNs of multiple volumes in parallel. FIG. 6A illustrates one embodiment of an administrative thread 603 (e.g., virtual disk admin thread) and multiple worker threads 604 that are configured to perform initialization tasks of an initialization process 600 in parallel. In particular, the initialization process 600 includes initializing a virtual disk on-lining procedure 601 for initializing multiple LUNs of multiple volumes. This on-lining procedure 601, unlike the on-lining procedure 501 of FIGS. 5A-5C, includes executing an administrative thread 603 and multiple worker threads 604 to perform various initialization tasks in parallel. The virtual disk on-lining procedure 601 includes delegating work 601 to the worker threads 604, one volume per thread. The delegated work 601 may include a set of first initialization tasks 621. The set of first initialization tasks 621 may include individual initialization tasks for each of the volumes. In one embodiment, the first initialization tasks 621 include determining the number of LUNs in the respective volume. The first initialization tasks 621 may include additional tasks, such as reading the VTOC information for accessing each specific LUN, loading and/or reading metadata, and/or preparing to send commands and/or data to the file system layer in the file system interaction 602, such as an asynchronous message to the file system layer 21. These operations may be performed in parallel by each of the worker threads. The initialization tasks may be delegated to a pool of worker threads that are available to perform initialization tasks. It should be noted that instead of the virtual disk administrative thread 603 sending the asynchronous message 525 as done in FIGS. 5A-5C, each of the worker threads 604 independently sends the asynchronous message per LUN. Each worker thread can perform this work independently of each other. The file system layer 21 receives the asynchronous messages in parallel and loads the LUN metadata of the respective LUNs. When the file system layer 21 has loaded the LUN metadata for the respective LUN, the file system layer 21 sends a backdoor reply message, reply message 605 to the virtual disk administrative thread 603 to acknowledge that the file system layer 21 is completed processing for that LUN. The file system layer 21 is performing operations on a per-LUN basis because each backdoor message that is sent to the file system layer 21 is referencing one LUN. When the virtual disk administrative thread 603 receives the reply 605 for a particular LUN, additional work (e.g., final work) 606 is delegated to the worker threads, one LUN per thread. The additional work 606 may include registering the respective LUN with the virtual disk module 61 and the SCSI target 28, making the respective LUN available for data access.

In one embodiment, the virtual disk administrative thread 603 waits to receive all the replies 605 from the file system layer 21 before it delegates the final work 606 to the worker threads 604. Alternatively, the virtual disk administrative thread 603 starts to assign the final work 606 to the worker threads 604 as the replies 605 are received. The final work 606 includes a second set of initialization task 622, which includes performing any additional initialization tasks to prepare the LUNs for data access. Each worker thread is independently assigned an initialization task to perform in parallel to the other worker threads 604.

FIG. 6B illustrates one embodiment of the administrative thread 603 and the multiple worker threads 604 that are configured to perform initialization tasks 601 in parallel. The virtual disk administrative thread 603 is configured to delegate work 601, including first initialization tasks 621, to each worker thread 604. The initialization task 621 may include the process of reading the VTOC 63 to obtain the file handle for the LUN in the volume that the respective worker thread 604 is processing. Reading the VTOC 63 is done synchronously. Once the worker thread 604 has completed this initialization task 621, the worker thread 604 sends an asynchronous message to the file system layer 21 to load the LUN metadata before iterating to the next LUN in the volume (not illustrated in FIG. 6B). Each worker thread iterates this operation for each LUN that is in the volume it is processing. The initialization task 621 may also include preparing to send commands or data in the file system interaction 602, such as a synchronous command to the file system layer 21 to read metadata data 612, in the file system interaction 602. Instead of the administrative thread 603 sending the command for each of the LUNs of a volume, the worker threads 604 individually send the command to the file system layer 21. The command sent by the worker threads 604 is a synchronous command which means that worker thread 604 is halted while the command is being process by the file system layer 21. While halted, the worker thread 604 is blocked for I/O access, which means that the thread of control which issued the request (e.g., the respective worker thread) cannot make forward progress until the I/O operation completes. As such, the respective worker thread is waiting or blocked on the I/O operation. It should be noted that in this embodiment, the worker thread threads that are not blocked for I/O operations can still continue to run, which allows for an increase in utilization of the resources of the data storage system. Also, it should be noted that unlike the embodiments of FIG. 5A-5C, the administrative thread 603 is not halted or blocked for I/O operations since the requests are issued by the worker threads instead. Alternatively, the initialization tasks 621 may include other initialization tasks to be performed by the worker threads 604 as part of the initialization process 600. After the file system layer 21 has read the metadata 612, the file system layer 21 may send a reply message to the virtual disk administrative thread 603 to acknowledge that the metadata 612 has been read (not illustrated in FIG. 6B). Since the work 601 is delegated to the worker threads, the initialization tasks are not serially iterated for each of the LUNs, but are performed in parallel.

FIG. 6C illustrates one embodiment of the administrative thread 603 and the multiple worker threads 604 that are configured to perform additional initialization tasks 630 of the initialization process 600 in parallel. The virtual disk administrative thread 603 is configured to perform the additional initialization tasks by delegating the work 630 to the worker threads 604. The administrative thread 603 delegates the work 630 to the worker threads 604, which includes first, assigning the first initialization task 631 to each of the worker threads on a one volume per thread basis. The first initialization task is configured to determine the number of LUNs (N) in the current volume. This is done for each volume on a one volume per thread basis. After the first initialization task 631 has been performed, each of the worker threads performs the second initialization task 632, and the third initialization task 633. The second initialization task 632 is configured to read the VTOC information (e.g., file handle information for LUN) by sending a synchronous message to the file system layer 21 to obtain the file handle of the LUN. While the file system layer 21 is retrieving the VTOC entry for the specified LUN, the worker thread which issued the request is halted or blocked until the file system layer 21 has completed the request. The third initialization task 633 is similar to the initialization task 523 performed in FIG. 5C, except the worker thread 604 is issuing the asynchronous message(s) to the file system layer 21 instead of the administrative thread 503. Each worker thread executes a loop inside the second initialization task 632 to iterate over each of the LUNs found in the volume it has been assigned to process. For each LUN, the worker thread 604 performs the third initialization tasks 633, which sends an asynchronous message to the file system layer 21. For example, if there are 10 LUNs in the volume, the worker thread sends 10 asynchronous messages to the file system layer 21 for the volume assigned to the worker thread.

The file system layer 21 receives the asynchronous message 625 and loads the metadata associated with the LUN that is referenced in the asynchronous message. When the file system layer 21 has completed loading the LUN metadata, the file system layer 21 may send an asynchronous reply message to the administrative thread 603 to acknowledge that the file system layer 21 is finished (not illustrated in FIG. 6C). After the virtual disk administrative thread 603 receives the reply message or after the third initialization tasks 633 has been performed, the worker threads 604 each perform a fourth initialization task 634, which may include initialization tasks to register the LUN for data access. The fourth initialization task 634 includes performing any additional initialization tasks to prepare the current LUN for data access, such as registering the LUN with the virtual disk module 61 and the SCSI target layer 28, making the LUN available for data access. While performing the initialization task 634, synchronous backdoor messages 626 are sent to the file system layer 21 by the worker threads 604.

Figure 6D:
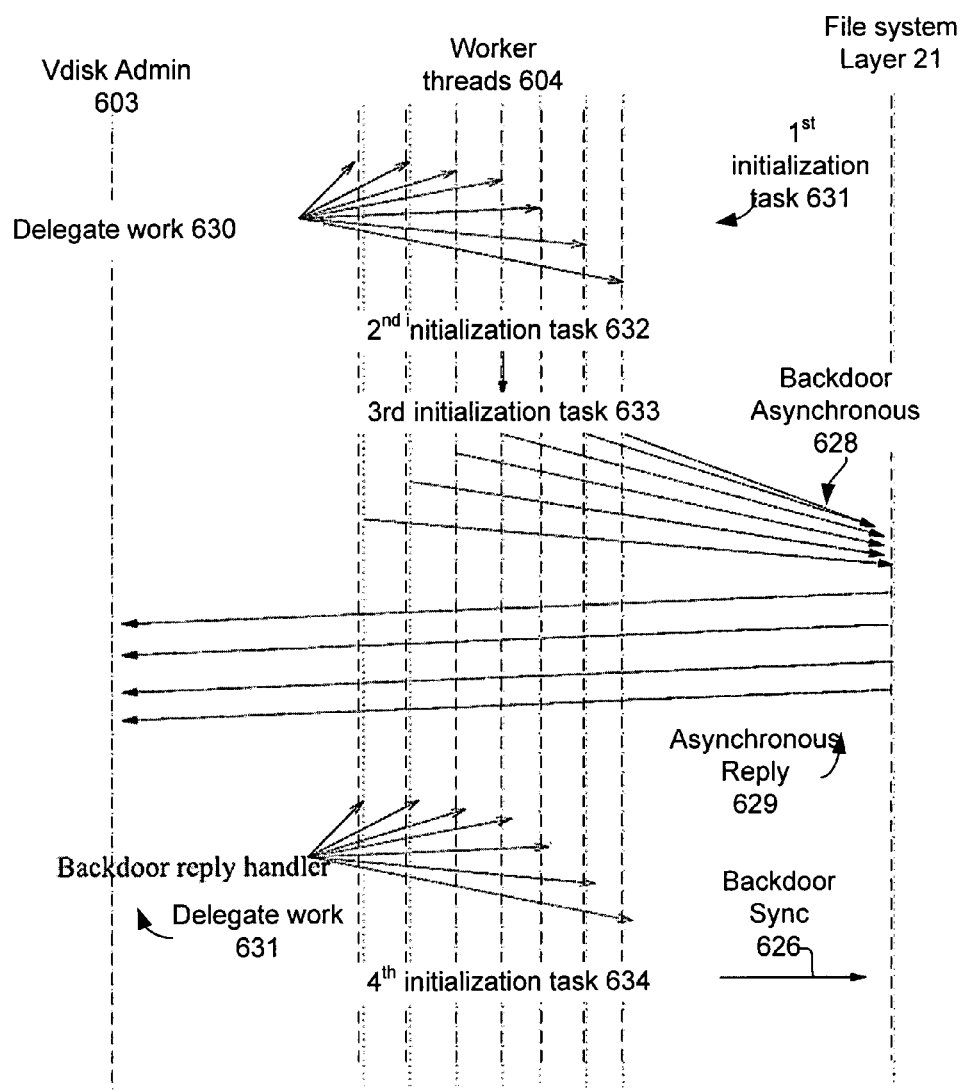
FIG. 6D illustrates another embodiment of the administrative thread and the multiple worker threads that are configured to perform additional initialization tasks of the initialization process in parallel.

FIG. 6D illustrates another embodiment of the administrative thread 603 and the multiple worker threads 604 that are configured to perform additional initialization tasks 630 of the initialization process 600 in parallel. The virtual disk administrative thread 603 is configured to perform the additional initialization tasks by delegating the work 630 to the worker threads 604. The administrative thread 603 delegates the work 630 to the worker threads 604, which includes first, assigning the first initialization task 631 to each of the worker threads on a one volume per thread basis. The first initialization task is to determine the number of LUNs (N) in the current volume. This is done for each volume on a one volume per thread basis. After the first initialization task 631 has been performed, each of the worker threads performs the second initialization task 632, and the third initialization task 633. The second initialization task 632 is configured to read the VTOC information (e.g., file handle information for LUN) by sending a synchronous message to the file system layer 21 to obtain the file handle of the LUN. While the file system layer 21 is retrieving the VTOC entry for the specified LUN, the worker thread which issued the request is halted or blocked until the file system layer 21 has completed the request. It should be noted that the LUN itself is not accessed in this operation, but the VTOC, which is part of the file system layer metadata, is read to construct the file handle information for that particular LUN. The third initialization task 633 is similar to the initialization task 523 performed in FIG. 5C, except the worker thread 604 is issuing the asynchronous message(s) to the file system layer 21 instead of the administrative thread 503. Each worker thread executes a loop inside the second initialization task 632 to iterate over each of the LUNs found in the volume it has been assigned to process. For each LUN, the worker thread 604 performs the third initialization tasks 633, which sends an asynchronous message to the file system layer 21. For example, if there are 10 LUNs in the volume, the worker thread sends 10 asynchronous messages to the file system layer 21 for the volume assigned to the worker thread.

Each of the worker threads 604 is configured to send an asynchronous message 628 to the file system layer 21 as part of the third initialization task 633 for each of the LUNs of the volume to which it is assigned. The file system layer 21 receives the asynchronous message 628 and loads the LUN metadata. When the file system layer 21 has completed loading the LUN metadata, the file system layer 21 sends an asynchronous reply message 629 to the administrative thread 603 to acknowledge that the file system layer 21 is finished with each of asynchronous messages 628. After the virtual disk administrative thread 603 receives the reply message 629, the virtual disk administrative thread 603 delegates work 631 to the worker threads 604. The delegated work 631 includes backdoor reply handler initialization tasks, including the fourth initialization tasks 634 to prepare the LUN for data access, which may include registering the LUN with the virtual disk module 61 and the SCSI target layer 28, making the LUN available for data access. The worker threads 604 may perform other additional initialization tasks to prepare the current LUN for data access. While performing the initialization task 634, synchronous backdoor messages 626 are sent to the file system layer 21 by the worker threads 604.

As described above, since the initialization process 600 of FIGS. 6A-6D is performed in parallel for each of the volumes and each of the LUNs, the initialization process 600 uses an administrative thread 603 and worker threads 604 to perform similar initialization tasks as done conventionally. These initialization tasks, however, are performed more efficiently than the initialization tasks of the conventional systems since the initialization tasks are performed in parallel, as opposed to serially. This allows the administrative thread 603 to be free to perform additional tasks after the administrative thread 603 has delegated the work to the worker threads 604. The parallelization of the work (e.g., initialization tasks) reduces the chance of a processing bottleneck at the administrative thread 603 in file systems with large numbers of LUNs, as compared to the single administrative thread 503 of the conventional systems. The parallelization of the work (e.g., initialization tasks) also greatly speeds up the overall boot or failover process by making better use of the available resources of the storage system, such as available processing, memory, and I/O capabilities of the storage server 2.

Figure 7:
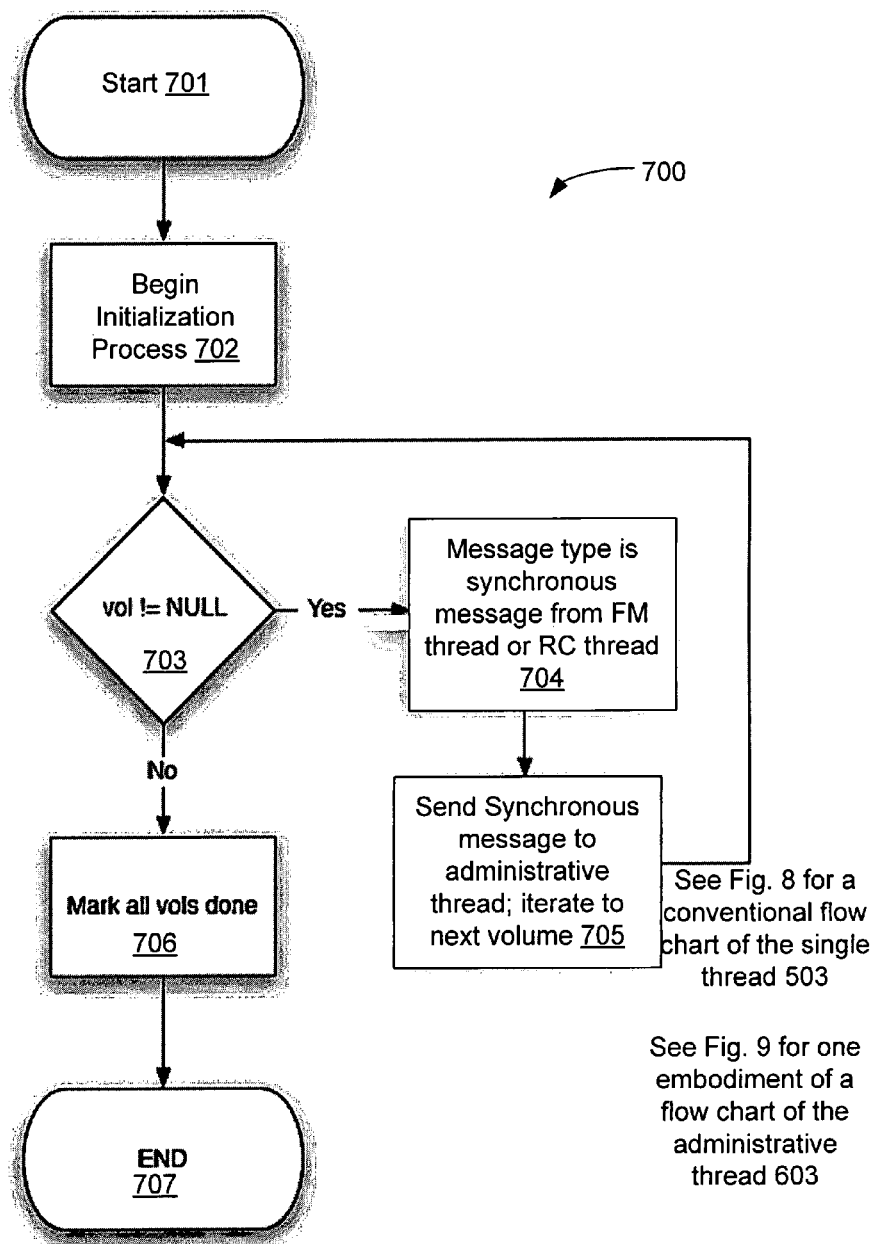
FIG. 7 illustrates a flow chart of one embodiment of initializing the initialization process, including the operations of the boot or failover monitoring thread.
Figure 8:
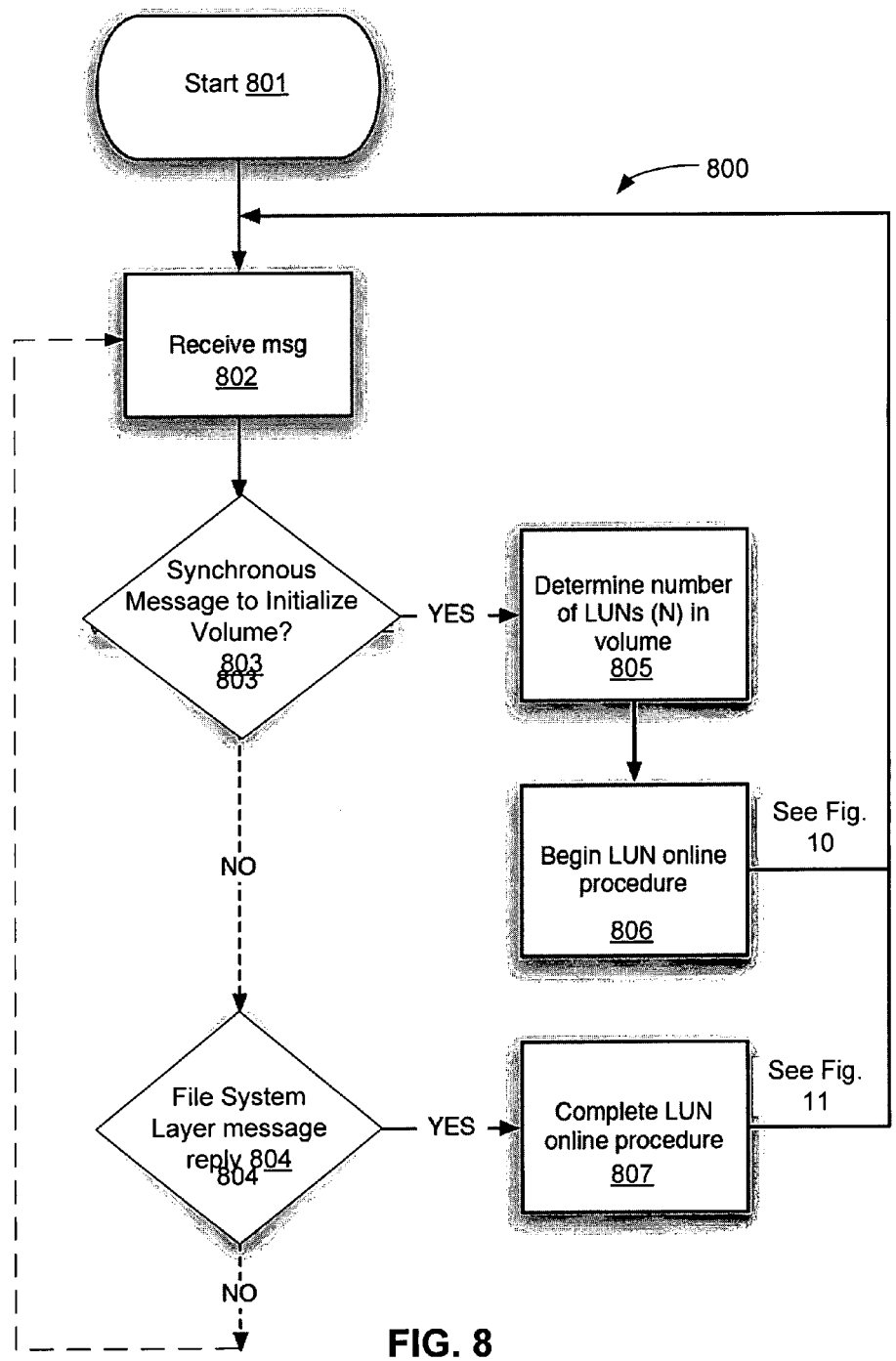
FIG. 8 illustrates a conventional flow chart of a single administrative thread receiving the synchronous message to initialize a particular volume from the monitoring thread in an operation of FIG. 7.
Figure 9:
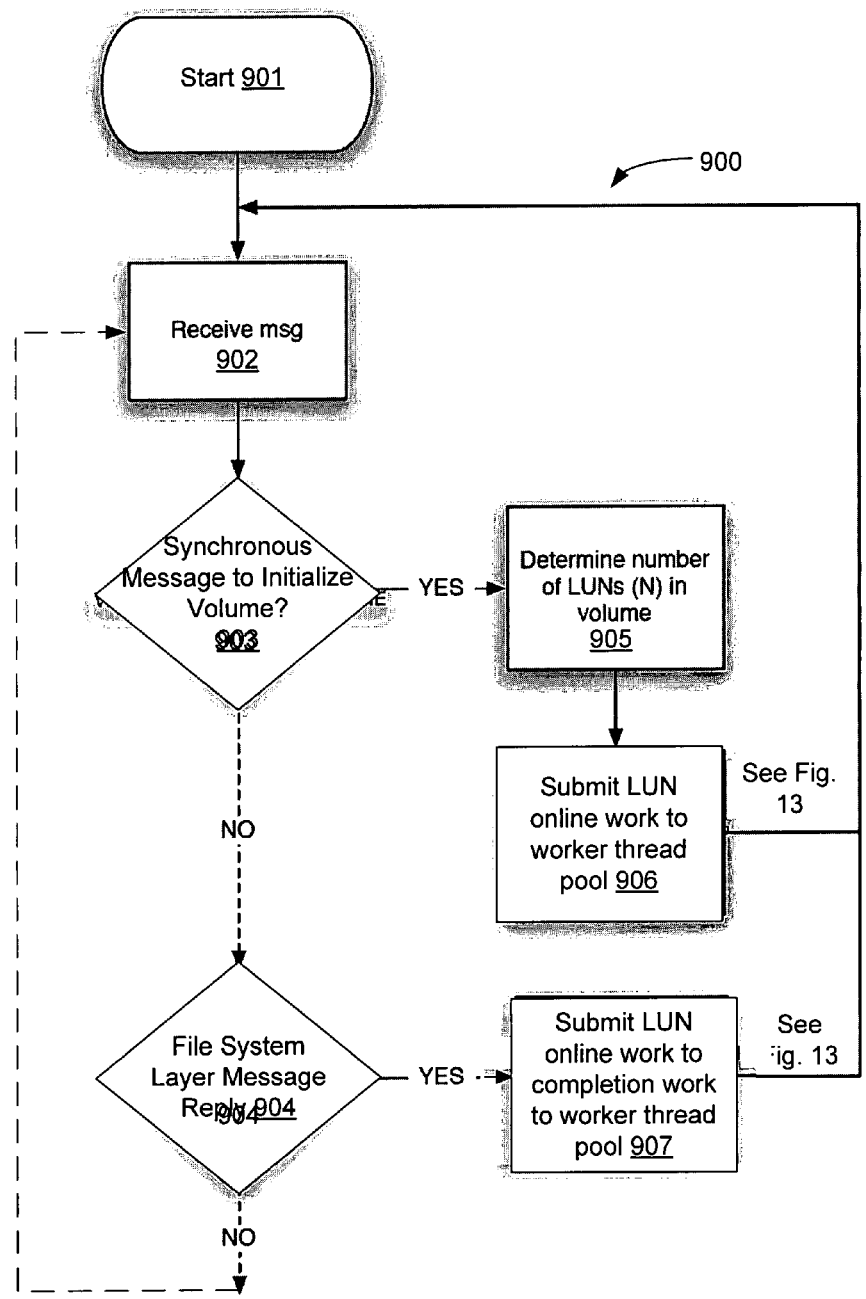
FIG. 9 illustrates one embodiment of a flow chart of the administrative thread receiving the synchronous message to initialize a particular volume from the monitoring thread in an operation of FIG. 7.
Figure 10:
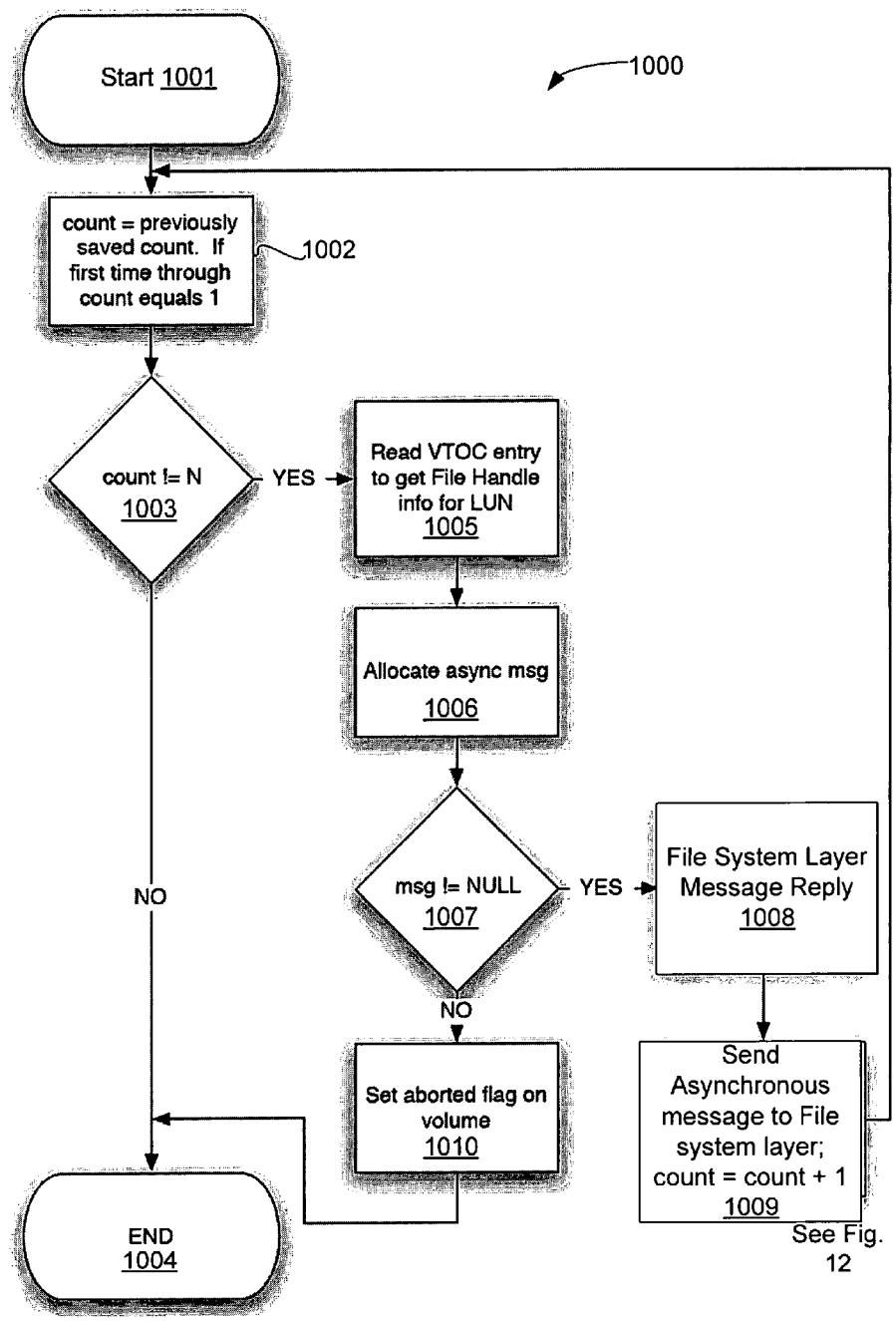
FIG. 10 illustrates one embodiment of a flow chart of the beginning of the initialization procedure.

FIGS. 7-13 illustrate one embodiment of a method for initializing multiple volumes having multiple LUNs. FIG. 7 illustrates a flow chart of one embodiment of initializing an initialization process 700, including the operations of the boot or failover monitoring thread. The initialization process 700 is started at operation 701, and the initialization process begins, operation 702. The process then determines if there are any volumes left to be initialized, operation 703. If there are volumes to be initialized, the process includes preparing to send a synchronous message to initialize the volume using a thread, such as the failover monitor thread (e.g., FM thread) in the failover context or a boot monitoring thread (e.g., RC thread) in the boot context. Once the message type has been set to initialize the volume message type in operation 704, the synchronous message is sent to the administrative thread (e.g., 603) to initialize the particular volume, and the monitor thread iterates to the next volume, operation 705. It should be noted that because this is a synchronous message, the thread is blocked or halted in operation 705 until the operation 1004 in FIG. 10 is completed. In the worker thread model, operation 705 is blocked until process 906 is completed. It can be seen that in the worker thread model, the failover thread or boot thread is blocked for much shorter time when using the worker threads, because much of the work is offloaded out of the serial path of the failover thread or boot thread. After the synchronous message is sent for that particular volume, the process returns to determine if there is another volume that needs to be initialized in operation 703. Once all the volumes have been initialized, the volumes are marked as done, operation 706, and the initialization process 700 ends, operation 707. This only means that all of the volumes have been processed and not that the LUN on-lining procedure has completed. As described above, the preparatory tasks are independent of the registration tasks of the on-lining procedure. The boot or failover thread is more sensitive to the preparatory tasks because there are serial tasks which affect how fast the boot or failover thread can make progress in the initialization process. The registration tasks are performed completely in the context of the administrative thread or the worker thread. It should be noted that the LUN on-lining procedure has not been completed until operation 1104 of FIG. 11 has been performed.

FIG. 8 illustrates a conventional flow chart 800 of the single administrative thread 503 receiving the synchronous message to initialize a particular volume from the monitoring thread in operation 705 of FIG. 7. The flow chart 800 starts in operation 801, and determines if the single administrative thread 503 has received a message, operation 802. It should be noted that the operation 802 includes the administrative thread checking its message queue to see if a message arrives. If no message exists, it simply blocks or waits indefinitely until a message arrives. If there is a queue of multiple messages the administrative thread is able to take the first message in the queue and continue work immediately so there is no waiting involved in the case. It continues in this fashion indefinitely until the message queue is drained at which time it is blocked or halted, waiting for more messages to arrive. The single administrative thread 503 then determines if the message type is the synchronous message to initialize the volume generated by the monitoring thread in operation 704 of FIG. 7 to initialize the volume, operation 803. If the message type is not to initialize the volume message, the single administrative thread 503 determines if the message type is a file system layer message reply, operation 804. If the message type is not the reply message from the file system layer 21, then the process goes back to the operation 802 to receive the next message. For simplicity, the embodiment of FIG. 8 only illustrates and describes the two message types relevant to the LUN on-lining procedure.

If the single administrative thread 503 determines that the message type is the synchronous message received from the monitoring thread in operation 803, the single administrative thread 503 determines the number of LUNs (N) in the particular volume, operation 805, and begins the initialization procedure (e.g., LUN on-line procedure) for the volume, operation 806. Beginning the initialization procedure may include initialization tasks to discover the LUNs of a particular volume, load the metadata for each of the LUNs of the particular volume. The operation 806 is further described with respect to FIG. 10. However, if the single administrative thread 503 determines that the message type is the reply message from the file system 21 in operation 804, the single administrative thread 503 completes the initialization procedure (e.g., LUN on-line procedure) for the volume, operation 807. Completing the initialization procedure may include initialization tasks to register for data access each of the LUNs of a particular volume with the file system layer. The operation 807 is further described with respect to FIG. 11.

FIG. 9 illustrates one embodiment of a flow chart 900 of the administrative thread receiving the synchronous message to initialize a particular volume from the monitoring thread in operation 705 of FIG. 7. The flow chart 900 starts in operation 901, and determines if the administrative thread 603 (e.g., virtual disk administrative thread) has received a message, operation 902. The administrative thread 603 then determines if the message type is the synchronous message to initialize the volume generated by the monitoring thread in operation 704 of FIG. 7 to initialize the volume, operation 903. If the message type is not to initialize the volume message, the single administrative thread 503 determines if the message type is a file system layer message reply, operation 904. If the message type is not the reply message from the file system layer 21, then the process goes back to operation 902 to receive the next message. For simplicity, the embodiment of FIG. 8 only illustrates and describes the two message types relevant to the LUN on-lining procedure. If the administrative thread 603 determines that the message type is the synchronous message received from the monitoring thread in operation 903, the single administrative thread 503 determines the number of LUNs (N) in the particular volume, operation 905, and begins the initialization of the LUNs procedure (e.g., LUN on-line procedure) for the volume by submitting LUN initialization work (e.g., initialization tasks) to the pool of worker threads 604, operation 906. For example, the administrative thread 603 can send a command to each of the worker threads to perform an initialization task of reading the VTOC information for a LUN. The operation 905 may be assigned to the pool of worker threads 604 to determine the number of LUNs for each volume. The operation 906 is further described with respect to FIG. 13. However, if the administrative thread 603 determines that the message type is the reply message from the file system 21 in operation 904, the administrative thread 603 completes the initialization procedure (e.g., LUN on-line procedure) for the volume by submitting the LUN initialization work (e.g., initialization tasks) to the pool of worker threads 604, operation 907. The operation 907 is further described with respect to FIG. 13. If the message is not the reply message from the file system layer 21, then the process goes back to operation 902 to receive the next message. It should be noted that for simplicity, the embodiment of FIG. 9 only illustrates and describes the two message types relevant to the LUN on-lining procedure. It should be noted that once the work has been delegated, the administrative thread 603 is available to continue processing additional tasks. This allows the administrative thread to not cause a processing bottleneck for the initialization process 700.

FIG. 10 illustrates one embodiment of a flow chart 1000 of the beginning of the initialization procedure (e.g., LUN on-line procedure). The flow chart 1000 starts in operation 1001, and sets a count value to the previously saved count, or if the process is just starting, the counter is set to equal 1, operation 1002. The flow chart 1000 then determines if the current count is equal to the number of LUNs in the volume, operation 1003. This operation is used to determine if there are any additional LUNs in the volume that need to be initialized. Once there are no additional LUNs that need to be initialized, the flow chart 1000 ends, operation 1004. However, if there are any additional LUNs that need to be initialized, as determined in the operation 1003, the thread (e.g., single administrative thread 503 in the conventional system or a worker thread 604 in one embodiment) reads the VTOC information to get the file handle information for the particular LUN, operation 1005. The thread then allocates the asynchronous message to the file system layer 21, operation 1006. It should be noted that in operation 1006, the message has been only been allocated, but not sent yet. The operation 1007 simply checks whether memory allocation in operation 1006 succeeded. IF the system failed to allocate a memory object in operation 1006, then the message equals null, which caused the aborted flag to be set on the volume in operation 1010, and the process ends, operation 1004. The operation 1008 is performed when the message object is successfully allocated in operation 1006. In this case the message type is set to the file system layer reply message type and the message is sent asynchronously to the file system layer 21 in operation 1009. Once the message has been sent, the count is incremented by one before returning to operation 1002. This process repeats until all of the LUNs are initialized.

FIG. 11 illustrates one embodiment of the flow chart 1100 of the completion of the initialization procedure (e.g., LUN on-line procedure). The flow chart 1100 starts in operation 1101, and registers the LUN with the virtual disk module 61 and the SCSI target 28 subsystems, operation 1102. Once the thread has registered with LUN with the virtual disk module 61 and SCSI target 28 subsystems in operation 1102, the thread determines if all the volumes are initialized, operation 1103. If all the volumes are initialized in operation 1103, the thread notifies the waiters that initialization of the LUNs (e.g., LUN on-lining) has completed, operation 1104. In effect, the system is notified that the LUN on-lining procedure has completed. Once all the volumes are initialized in operation 1103, and once all the waiters have been notified that the initialization of the LUNs is completed in operation 1104, the thread releases the asynchronous message, operation 1105. In this operation, the asynchronous message is deleted after the LUN has been registered. It should be noted that operation 1105 is performed regardless of the determination in operation 1103. Then the process determines if any of the volumes have been aborted, operation 1106. If so, the thread resets the aborted flag and restarts the initialization process for the particular volume that was aborted, operation 1107. If none of the volumes were aborted in operation 1106, or if the initialization process has been restarted for the particular for volume that has been aborted in operation 1107, and the process ends, operation 1108.

Figure 12:
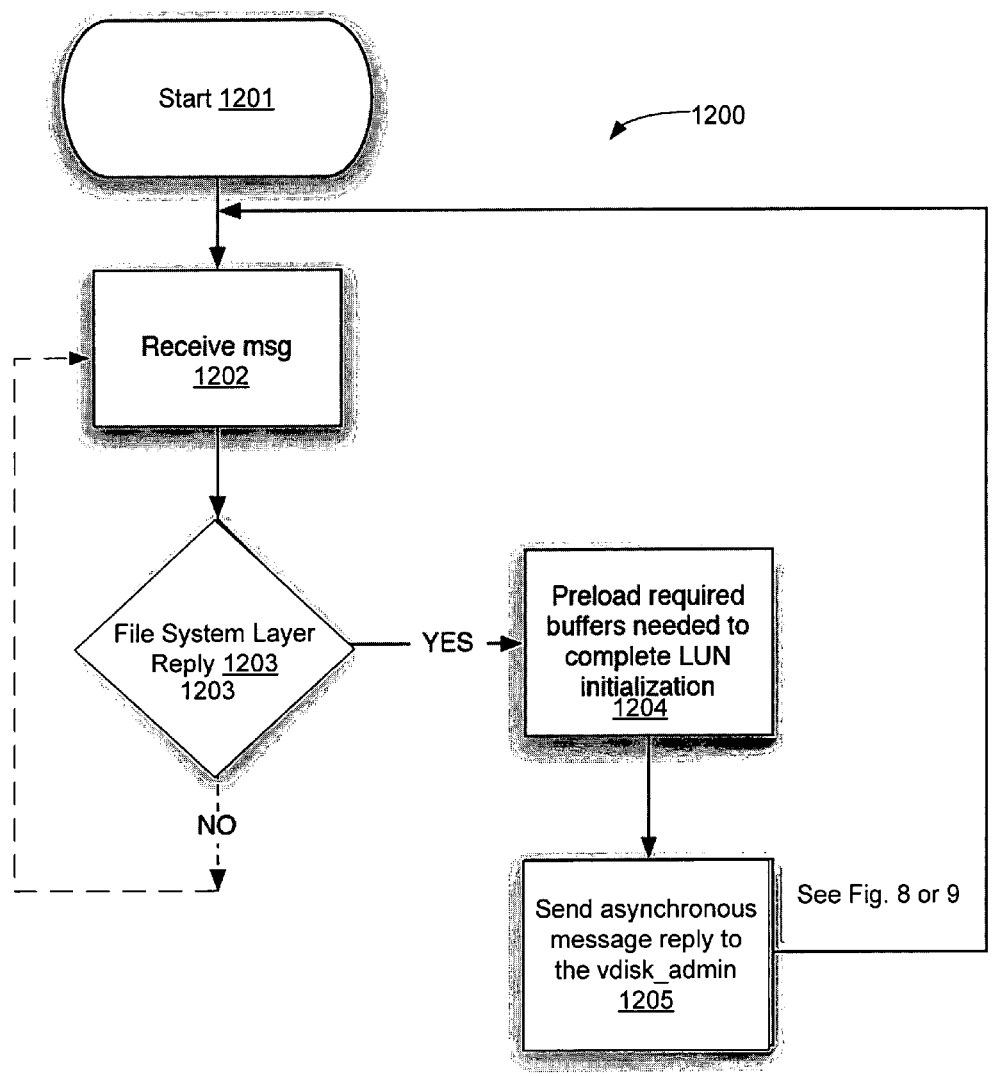
FIG. 12 illustrates one embodiment of a flow chart of operations of a file system layer thread.

FIG. 12 illustrates one embodiment of the flow chart 1200 of the file system layer 21. The flow chart 1200 starts in operation 1201, and the file system layer 21 determines if the message has been received from the thread (e.g., single administrative thread 503 or worker thread 604), operation 1202. The file system layer 21 determines if the received message in operation 1202 is the asynchronous backdoor message sent in operation 1009 of FIG. 10, operation 1203. If the message type received in operation 1202 is the asynchronous backdoor message, then the file system layer 21 pre-loads, the required buffers needed to complete the LUN initialization, operation 1204, and sends an asynchronous reply to the administrative thread (e.g., administrative thread 603, or single administrative thread 503). The description of the thread receiving the asynchronous reply from the file system layer 21 has been described in the operations 804 and 904 of FIGS. 8 and 9. Once the file system layer 21 has sent the asynchronous reply to the thread in operation 1204, the process returns to determine if a message has been received in operation 1202. The operations of FIG. 12 may be performed by a file system layer thread of the file system layer 21.

Figure 13:
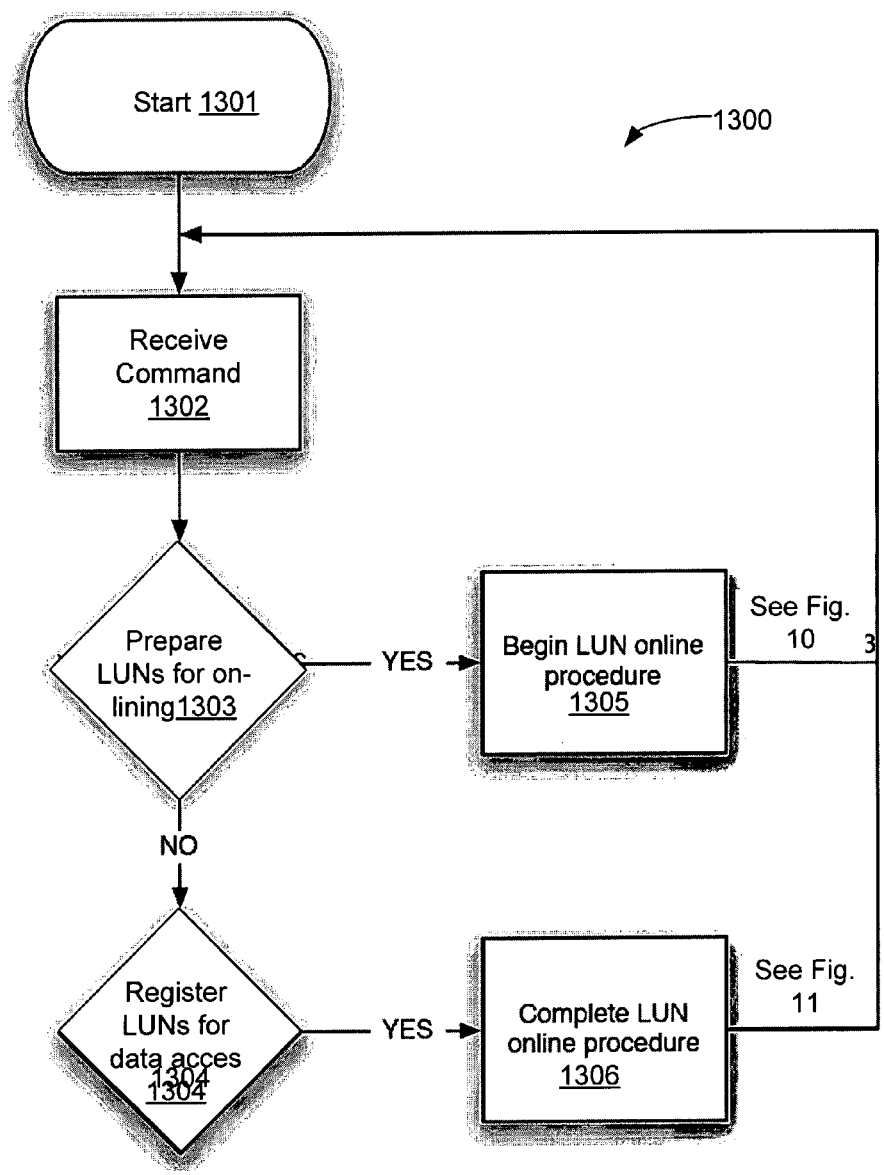
FIG. 13 illustrates one embodiment of a flow chart of operations of multiple worker threads.

FIG. 13 illustrates one embodiment of a flow chart 1300 of the worker threads 604. The flow chart 1300 starts in operation 1301, and the worker thread 604 receives a command from the administrative thread 603, operation 1302. The worker thread then determines if the command received in operation 1302 is a first command type, such as a command type that is configured prepare the LUNs for on-lining, operation 1303. The first command type may include, for example, commands to discover the LUNs of a particular volume, load the metadata of the LUNs, and/or read the metadata of the LUNs, such as by reading the VTOC of the particular volume for each LUN of the particular volume. If the worker thread determines that the command received is not the command to prepare the LUNs for the on-lining procedure, then the worker thread 604 determines if the command received in operation 1302 is a second command type, such as a command type that is configured to register the LUNs for data access, operation 1304. The second command type may include, for example, commands to register the LUNs of a particular volume with the operating system (e.g., virtual disk module 61 and/or SCSI target layer 28). If the command received is the command to prepare the LUNs for the on-lining procedure in operation 1303, the worker thread begins the initialization procedure (e.g., LUN on-line procedure) for preparing the LUNs for data access, operation 1305. The operation 1305 is further described with respect to FIG. 10. If the command received is the command to register the LUNs for data access in operation 1304, the worker thread completes the initialization procedure (e.g., LUN on-line procedure) by performing the registration of the LUNs, such as with the virtual disk module 61 and the SCSI target layer 28, operation 1306. The operation 1306 is further described with respect to FIG. 11. It should be noted that each worker thread in the worker thread pool is executing the operations of the flow chart 1300. This allows multiple worker threads to be executing the operations of flow charts 1000 and 1100 in parallel. In another embodiment, since the worker thread is assigned one of the two commands, only one decision block 1304 is used to determine whether the command received is either to prepare the LUN for the on-lining procedure or to register the LUN with the operating system. Upon receiving the command to prepare the LUN for the on-lining procedure, the process proceeds to operation 1305. However, upon receiving the command to register the LUN with the operating system, the process proceeds to operation 1306.

It should be noted that different threads are executing different parts of the initialization process. It should also be noted that the conventional initialization process includes the various operations performed by the following threads: 1) the boot or failover thread (e.g., monitoring thread) as illustrated in FIG. 7, 2) the single administrative thread 503 (labeled as the virtual disk administrative thread) in FIGS. 8, 10, and 11, and 3) the file system layer thread as illustrated in FIG. 12. In contrast, the embodiments of the initialization process described herein includes the various operations performed by the following threads: 1) the boot or failover thread (e.g., monitoring thread) as illustrated in FIG. 7, 2) the administrative thread 603 as illustrated in FIG. 9, 3) the worker threads 604 as illustrated in FIGS. 10, 11, and 13, and 4) the file system layer thread as illustrated in FIG. 12. FIGS. 9 and 13 illustrate where the embodiments described herein differ from the conventional initialization process, as well as how the administrative thread and worker threads can be used in already existing procedures. Alternatively, new procedures may be used that include the processes performed by the administrative thread and worker threads in order to initialize multiple LUNs in multiple volumes.

In one embodiment, the method of operating the storage server 2 includes initializing an initialization process (e.g., 600 or 700) of multiple LUNs (e.g., data storage units) a volume. As part of the initialization process, the method includes initializing the data storage units in parallel to prepare the data storage units for data access by the clients 1. The initialization of the multiple data storage units includes processing in parallel one or more initialization tasks for each of the data storage units using multiple worker threads 604. The multiple worker threads 604 are assigned the initialization tasks by an administrative thread 603 (e.g., virtual disk administrative thread). Processing initialization tasks in parallel may include assigning the initialization tasks to each of the worker threads 604, and the worker threads 604 independently performing each of the initialization tasks. Initialization tasks may be assigned to prepare the data storage units of the volume to be registered for data access. Additional initialization tasks may be assigned to register the data storage units of the volume with the storage server, such as with the virtual disk module 61 and/or the SCSI target 28 of the protocol layer 22 of the operation system 20. Another one of the initialization tasks to prepare the data storage units to be registered may include reading a VTOC of a particular volume. One of the worker threads 604 reads the VTOC to obtain information for accessing the data storage units of the volume. The initialization tasks may include the worker threads 604 independently sending an asynchronous message to the file system layer (e.g., file system layer thread). The file system layer may be configured to load a buffer with metadata from each of the asynchronous messages received from the worker threads 604. Upon finishing the loading of the metadata from the asynchronous messages, the file system layer is configured to independently send a reply message to indicate that the loading is completed for the particular data storage unit. The reply message may be sent to the administrative thread or to the worker thread 604 that initially sent the asynchronous message. The initialization tasks may include the worker threads 604 independently sending a synchronous message or command to the file system layer (e.g., file system layer thread). Each of the synchronous command received from the file system may be a command to obtain a file handle for the particular data storage unit.

In another embodiment, additional initialization tasks are assigned to the worker threads 604 to register the multiple data storage units with the storage server, such as with the virtual disk module 61 and/or the SCSI target 28 of the protocol layer 22 of the operation system 20. Alternatively, any of the following additional initialization tasks may be performed: 1) opening each of the plurality of data storage units by one of the plurality of worker threads, 2) performing an administrative task on each of the plurality of data storage units by one of the plurality of worker threads, 3) registering each of the plurality of data storage units of the first volume with the virtual disk subsystem (e.g., virtual disk module 61) by one of the plurality of worker threads, 4) registering each of the plurality of data storage units of the first volume with the SCSI target 28 of a protocol layer for block level access by the client by one of the plurality of worker threads, and/or 5) notifying that each of the plurality of data storage units is initialized by one of the plurality of worker threads.

The administrative thread may be configured to delegate work to the worker threads 604 (e.g., pool of worker threads) on a one data storage unit per thread basis. In one embodiment, the worker threads 604 are configured to send a synchronous message to the file system layer to perform some initialization task. In another embodiment, the administrative thread is configured to send a synchronous message to the file system layer to perform some initialization task.

In another embodiment, the initialization procedure includes initiating a second initialization process of multiple data storage units of a second volume, and initializing the data storage units of the second volume in parallel for data access. The initialization process of the multiple data storage units of the second volume is similar to the initialization process described above with respect to the first volume.

In another embodiment, the method of operating the storage server 2 includes initializing an initialization process (e.g., 600 or 700) of multiple LUNs (e.g., data storage units) of multiple volumes, which each have multiple LUNs (e.g., data storage units). It should be noted that the volumes are initialized in operation 420 in FIG. 4. It should also be noted that LUNs are initialized on a per-volume basis because the VTOC is part of the volume metadata. So to access the LUNs, the VTOCs of which there is one for every volume in the storage server, are first accessed. As part of the initialization process, the method includes initializing the multiple data storage units in parallel for each volume. Initializing the multiple data storage units in parallel includes assigning initialization tasks to multiple worker threads 604, and each of the worker threads 604 independently performs each of the initialization tasks. One initialization task may include reading VTOC information for all of the data storage units in the first volume and reading VTOC information for all of the data storage units in the second volume. The initialization task of reading VTOC information is performed on a one volume per thread basis. Alternatively, the initialization tasks may include other operations, such as sending asynchronous or synchronous messages or commands to the file system layer (e.g., file system layer thread). The file system layer 21 may be configured to load a buffer with data from each of the asynchronous messages received from the worker threads 604. Upon finishing the loading of the data from the asynchronous messages, the file system layer is configured to independently send a reply message to indicate that the loading is completed for the particular data storage unit. The reply message may be sent to the administrative thread 603.

The method may further include assigning additional initialization tasks to the worker threads 604 on a one data storage unit per thread basis to register the data storage units, such as registering the data storage units of each volume with the virtual disk module 601 and/or the SCSI target 28 of the protocol layer 22. Alternatively, the method may further include assigning additional initialization tasks to the worker threads 604 on a one volume per thread basis.

In another embodiment, the initialization process of the storage server includes selecting a first volume and initializing the multiple data storage units of the first volume. Next, a subsequent volume is selected, and the data storage units of the subsequent volume are each initialized for data access. In one embodiment, the data storage units of the first volume are initialized by determining a number of data storage units in the first volume, assigning initialization tasks for each of the data storage units to the worker thread 604, and independently indicating that each of the data storage units of the first volume is initialized. Similarly, the data storage units of the second volume are initialized by determining a number of data storage units in the second volume, assigning initialization tasks for each of the data storage units to the worker thread 604, and independently indicating that each of the data storage units of the second volume is initialized. After the plurality of data storage units of each of the volumes, the process includes indicating that the plurality of volumes are initialized.

In another embodiment, the method of initializing multiple LUNs in the first and second volumes each includes executing a boot thread or a failover thread to initiate an initialization procedure to initialize the plurality of data storage units in a particular volume (e.g., first or second volume), executing an administrative thread 603 to delegate initialization tasks of the initialization procedure for the particular volume to multiple worker threads 604, and executing the worker threads 604 to perform the delegated initialization tasks of the initialization procedure for the particular volume. The method may further include executing a file system layer thread to preload buffers for the initialization procedure for the particular volume. The work can be delegated to the worker threads 604 by the administrative thread 603 on a one volume per thread basis (e.g., reading the VTOC of the volume for each of the data storage units of the volume), or alternatively, on a one data storage unit per thread basis (e.g., loading and reading the metadata for each of the data storage units).

In one embodiment, the initialization task includes opening each of the data storage units by one of the worker threads, and performing an administrative task on each of the data storage units by one of the worker threads 604. In another embodiment, the initialization tasks include registering each of the data storage units with the SCSI target 28 of the protocol layer 22 for block level access by the client.

It should be noted that the embodiments described herein can be implemented in a storage server, as described with respect to FIGS. 1-3.

Embodiments of the present invention include various operations, as described above. These operations may be performed by hardware components, software, firmware, or a combination thereof. The various operations may be performed by executing one or more computer programs to perform functions of the embodiments by operating on input data and generating output data. The various operations may also be implemented in, for example, special purpose logic circuitry, e.g., a field programmable gate array (FPGA), digital signal processor (DSP), Application-specific integrated circuit (ASIC), programmable logic device (PLD), or the like). Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as one or more computer program products. The one or more computer programs may be tangibly embodied in an information carrier, e.g., in a machine-readable storage device or in a propagated signal, for execution by, or to control the operation of, one or more general-purpose or special-purpose processors to perform the described operations. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM disks); digital video disk (DVD) ROM disks, magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The processing device(s) described herein may include one or more general-purpose processing devices such as a microprocessor or central processing unit, a controller, or the like. Alternatively, the digital processing device may include one or more special-purpose processing devices such as a DSP, an ASIC, an FPGA, or the like. In an alternative embodiment, for example, the digital processing device may be a network processor having multiple processors including a core unit and multiple microengines. Additionally, the digital processing device may include any combination of general-purpose processing device(s) and special-purpose processing device(s).

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method of operation of a storage server, the method comprising:
    assigning, by an administration thread, a data storage unit of a plurality of data storage units to a respective independent worker thread of a plurality of independent worker threads; and
    initializing, by the respective independent worker thread, the data storage unit assigned to the respective independent worker thread, the plurality of independent worker threads initializing the plurality of data storage units in parallel, wherein initializing further comprises assigning the plurality of independent worker threads initialization tasks to register the plurality of data storage units for data access and assigning one of the plurality of independent worker threads to read a table of contents of a first volume,
    wherein assigning one of the plurality of independent worker threads to read the table of contents of the first volume comprises reading the table of contents of the first volume to obtain information for accessing the plurality of data storage units of the first volume.

2. The method of claim 1, wherein initializing further comprises each of the plurality of independent worker threads sending an asynchronous message to a file system layer by each of the plurality of independent worker threads for each of the plurality of data storage units.

3. The method of claim 2, wherein initializing further comprises each of the plurality of independent worker threads sending a synchronous message to a file system layer by each of the plurality of independent worker threads for each of the plurality of data storage units.

4. The method of claim 3, further comprising:
loading metadata for each data storage unit for each asynchronous message received by the file system layer; and
upon finishing the loading the metadata for each of the plurality of data storage units, independently sending a reply message to indicate that the loading is completed for the particular data storage unit.

5. The method of claim 4, further comprising reading the metadata for each data storage unit to obtain a file handle for the particular data storage unit for each synchronous message received by the file system layer.

6. The method of claim 1, wherein assigning initialization tasks to register the plurality of storage units comprises assigning additional initialization tasks to the plurality of independent worker threads, and wherein the plurality of independent worker threads are assigned the additional initialization tasks on a one data storage unit per thread basis.

7. The method of claim 6, wherein assigning additional initialization tasks comprises:
registering each of the plurality of data storage units with a virtual disk subsystem by one of the plurality of independent worker threads; and
registering each of the plurality of data storage units with a Small Computer System Interface (SCSI) target of a protocol layer for block level access by a client by one of the plurality of independent worker threads.

8. The method of claim 1, wherein the initialization tasks for each of the plurality of data storage units comprises at least one of:
opening each of the plurality of data storage units by one of the plurality of independent worker threads;
performing an administrative task on each of the plurality of data storage units by one of the plurality of independent worker threads;
registering each of the plurality of data storage units with a virtual disk subsystem by one of the plurality of independent worker threads;
registering each of the plurality of data storage units with a Small Computer System Interface (SCSI) target of a protocol layer for block level access by a client by one of the plurality of independent worker threads; or
notifying that each of the plurality of data storage units is initialized by one of the plurality of independent worker threads.

9. The method of claim 1, wherein the plurality of data storage are associated with a first volume and further comprising:
initializing a plurality of data storage units of the second volume in parallel for data access as part of a second volume initialization process.

10. The method of claim 9, wherein initializing the plurality of data storage units of the second volume comprises processing in parallel initialization tasks for each of the plurality of data storage units of the second volume using the plurality of independent worker threads.

11. The method of claim 10, wherein processing in parallel comprises:
assigning initialization tasks for each of the plurality of data storage units of the second volume to each of the plurality of independent worker threads; and
each of the plurality of independent worker threads independently performing each of the initialization tasks.

12. The method of claim 11, wherein assigning initialization tasks comprises:
assigning one of the plurality of independent worker threads to read the table of contents information of the first volume to determine the number of the plurality of data storage units in the first volume; and
assigning another of the plurality of independent worker threads to read the table of contents information of the second volume to determine the number of the plurality of data storage units in the second volume, wherein the plurality of independent worker threads read the table of contents information on a one volume per thread basis.

13. A method, comprising:
selecting a first volume of a plurality of volumes of a storage server, wherein the first volume contains a first plurality of data storage units;
assigning, by a first volume administration thread, a data storage unit of the first plurality of data storage units in the first volume to a respective independent worker thread of a plurality of independent worker threads;
initializing independently, by the respective first volume independent worker thread, the data storage unit assigned to the respective first volume independent worker thread, the plurality of first volume independent worker threads initializing the plurality of data storage units in the first volume in parallel, wherein initializing further comprises assigning the plurality of independent worker threads initialization tasks to register the plurality of data storage units for data access and assigning one of the first volume plurality of independent worker threads to read a table of contents of the first volume, wherein assigning one of the plurality of first volume independent worker threads to read the table of contents of the first volume comprises reading the table of contents of the first volume to obtain information for accessing the plurality of data storage units of the first volume;
selecting a second volume of the plurality of volumes of the storage server, wherein the second volume contains a second plurality of data storage units are inaccessible to data access until initialization;
assigning, by a second volume administration thread, each of the second plurality of data storage units in the second volume to a respective independent worker thread of a plurality of independent worker threads; and
initializing independently, by a respective second volume independent worker thread, the data storage unit assigned to the respective second volume independent worker thread, the plurality of second volume independent worker threads initializing the plurality of data storage units in the second volume in parallel, wherein initializing further comprises assigning the plurality of independent worker threads initialization tasks to register the plurality of data storage units for data access and assigning one of the second volume plurality of independent worker threads to read a table of contents of the second volume, wherein assigning one of the plurality of second volume independent worker threads to read the table of contents of the second volume comprises reading the table of contents of the second volume to obtain information for accessing the plurality of data storage units of the second volume.

14. The method of claim 13, wherein initializing the first plurality of data storage units of the first volume comprises:
determining a number of data storage units in the first volume;

assigning initialization tasks for each of the first plurality of data storage units in the first volume to the first plurality of independent worker threads; and independently indicating that each of the first plurality of data storage units of the first volume is initialized.

15. The method of claim 13, wherein initializing the second plurality of data storage units of the second volume comprises:

determining a number of data storage units in the second volume;

assigning initialization tasks for each of the second plurality of data storage units in the second volume to the second plurality of independent worker threads; and independently indicating that each of the second plurality of data storage units of the second volume is initialized.

16. The method of claim 13, further comprising indicating that the first and second plurality of data storage units are initialized.

17. The method of claim 13, wherein initializing the first and second plurality of data storage units comprises:

executing at least one of a boot thread or a failover thread to initiate an initialization procedure to initialize the first or second plurality of data storage units in a particular volume;

executing an administrative thread to delegate initialization tasks of the initialization procedure for the particular volume to a plurality of independent worker threads; and executing the plurality of independent worker threads to perform the delegated initialization tasks of the initialization procedure for the particular volume.

18. The method of claim 17, wherein initializing the first and second plurality of data storage units each further comprises executing a file system layer thread to preload buffers for the initialization procedure for the particular volume.

19. The method of claim 13, wherein initializing the first and second plurality of data storage units further comprises:

initiating an initialization procedure to iterate over the first and second volumes;

delegating work to a plurality of independent worker threads on a one volume per thread basis; and delegating work to the plurality of independent worker threads on a one data storage unit per thread basis.

20. A storage server, comprising:

a processor;

a first communication interface through which to communicate with an array of storage devices;

a second communication interface through which to communicate with a client of the storage server;

a file system layer to manage a plurality of volumes, each volume having a plurality of data storage units, wherein the plurality of data storage units are inaccessible to data access until initialization; and a memory storing instructions which configure the processor to initialize the plurality of data storage units in parallel to make the plurality of data storage units accessible for data access in each of the plurality of volumes as part of an initialization process of the storage server, by assigning, by an administration thread, a data storage unit of the plurality of data storage units in a first volume to a respective independent worker thread from a plurality of independent worker threads; and initializing, by the respective independent worker thread, the data storage unit assigned to the respective independent worker thread, the plurality of independent worker threads initializing the plurality of data storage units in parallel, wherein initializing further comprises assigning the plurality of independent worker threads initialization tasks to register the plurality of data storage units for data access, wherein initializing further comprises sending either an asynchronous message or a synchronous message to the file system layer to request the file system layer to perform an initialization task.

21. The storage server of claim 20, wherein the initialization process is part of either a boot process or a failover process of the storage server.

22. The storage server of claim 20, wherein initializing further comprises assigning each of the plurality of independent worker threads to prepare each of the plurality of data storage units to be registered for data access.

23. The storage server of claim 22, wherein each of the plurality of independent worker threads is configured to register each of the plurality of data storage units with a virtual disk subsystem and with a Small Computer System Interface (SCSD target of a protocol layer for block level access by the client.

24. The storage server of claim 20, wherein initializing further comprises assigning the plurality of independent worker threads to perform at least one of the following:

opening each of the plurality of data storage units by one of the plurality of independent worker threads;

performing an administrative task on each of the plurality of data storage units by one of the plurality of independent worker threads;

registering each of the plurality of data storage units with the virtual disk subsystem by one of the plurality of independent worker threads;

registering each of the plurality of data storage units with a Small Computer System Interface (SCSI) target of a protocol layer for block level access by the client by one of the plurality of independent worker threads; or notifying that each of the plurality of data storage units is initialized by one of the plurality of independent worker threads.

25. A storage server, comprising:

a processor;

a first communication interface through which to communicate with an array of storage devices;

a second communication interface through which to communicate with a client of the storage server;

a file system managed by a file system layer, wherein the file system contains a plurality of volumes, each volume having a plurality of data storage units, wherein the plurality of data storage units are inaccessible to data access until initialization;

a virtual disk subsystem coupled to the file system layer, wherein the virtual disk system comprises an administrative thread and a plurality of independent worker threads; and a memory storing instructions which configure the processor to initialize a plurality of data storage units of a volume in the file system and make the plurality of data storage units accessible for data access, by assigning, by the administration thread, a data storage unit of the plurality of data storage units in the volume to a independent worker thread from a plurality of independent worker threads; and initializing, by the respective independent worker thread, the data storage unit assigned to the respective independent worker thread, the plurality of independent worker threads initializing the plurality of data storage units in parallel, wherein initializing further comprises assigning the plurality of independent worker threads initialization tasks to register the plurality of data storage units for data access, wherein initializing further comprises sending either an asynchronous message or a synchronous message to the file system layer to request the file system layer to perform an initialization task.

26. The storage server of claim 25, wherein initializing further comprises assigning each of the plurality of independent worker threads to prepare each of the plurality of data storage units to be registered for data access.

27. The storage server of claim 25, wherein initializing further comprises at least one of:
- assigning each of the plurality of independent worker threads to open a data storage unit of the plurality of data storage units;
- assigning each of the plurality of independent worker threads to perform an administrative task on the opened data storage unit;
- assigning each of the plurality of independent worker threads to make a data storage unit of the plurality of data storage units known to a Small Computer System Interface (SCSI) target of a protocol layer for block level access;
- assigning each of the plurality of independent worker threads to register a data storage unit of the plurality of data storage units to allow input-output (I/O) accesses; or
- assigning each of the plurality of independent worker threads to indicate that a data storage unit of the plurality of data storage units is initialized.

28. The storage server of claim 25, wherein the virtual disk subsystem comprises means for reducing outage time as part of an initialization of either a boot process or a failover process of the storage server.

29. The storage server of claim 25, wherein the virtual disk subsystem comprises means for reducing application failures due to outage time of the storage server in a clustered environment.

30. The method of claim 1, wherein the plurality of data storage units are inaccessible to data access until initialization.

31. The method of claim 1, wherein a respective independent worker thread works in parallel relative to other independent worker threads.

* * * * *